(12) United States Patent
Morgan et al.

(10) Patent No.: US 12,458,825 B2
(45) Date of Patent: Nov. 4, 2025

(54) MOF-FABRIC COMPOSITES AND METHODS OF MOF-FABRIC COMPOSITE SYNTHESIS

(71) Applicant: North Carolina State University, Raleigh, NC (US)

(72) Inventors: Sarah Morgan, Raleigh, NC (US); Gregory Parsons, Raleigh, NC (US); Morgan Leyonna Willis, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 252 days.

(21) Appl. No.: 17/987,113

(22) Filed: Nov. 15, 2022

(65) Prior Publication Data

US 2023/0149760 A1    May 18, 2023

Related U.S. Application Data

(60) Provisional application No. 63/279,923, filed on Nov. 16, 2021.

(51) Int. Cl.
*A62D 3/30* (2007.01)
*A62D 101/02* (2007.01)
(Continued)

(52) U.S. Cl.
CPC .............. *A62D 3/30* (2013.01); *B01J 20/226* (2013.01); *B01J 20/261* (2013.01); *B01J 20/262* (2013.01);
(Continued)

(58) Field of Classification Search
CPC .... A62D 3/30; A62D 3/35; A62D 6/00; B01J 20/3212; B01J 20/226; B01J 20/261; B01J 20/262; B01J 20/321; B01J 20/28033; B01J 20/3219; B01J 20/3226; A62F 2101/02; A62F 2101/04; A62F 2101/26; D06B 5/22; D06M 2101/10; D06M 2101/20; D06M 2101/26; D06M 2101/28; D06M 2101/32; D06M 2101/34; D06M 2101/38; D06M 11/20; D06M 11/83; D06M 13/335; D06M 13/342; D06M 23/06; D10B 2331/02; D10B 2331/04; D10B 2331/10; D10B 2201/02; D10B 2321/022; D10B 2321/08; D10B 2321/10

See application file for complete search history.

(56) References Cited

U.S. PATENT DOCUMENTS

2023/0048741 A1\*   2/2023   Farha ................ B01F 35/71805

FOREIGN PATENT DOCUMENTS

WO    WO2017223046    * 12/2017

\* cited by examiner

*Primary Examiner* — Camie S Thompson
(74) *Attorney, Agent, or Firm* — THOMAS | HORSTEMEYER, LLP

(57) ABSTRACT

Provided are MOF-fabric composites having a crystalline MOF adhered directly to fibers of the fabric and methods of making MOF-fabric composites. A solution is adsorbed onto a fabric. The solution can include a metal salt, a linker, and a solvent. The solution is adsorbed onto the fabric and the fabric suspended over a heated vapor. The vapor releases onto the fabric, causing the metal salt, the linker, and the solvent to diffuse out of the polymer fibers. The linker links metal from the metal salts to form crystals attached to the fabric, and the vapor aids crystallization.

11 Claims, 24 Drawing Sheets

(51) Int. Cl.
  *A62D 101/26* (2007.01)
  *B01J 20/22* (2006.01)
  *B01J 20/26* (2006.01)
  *B01J 20/28* (2006.01)
  *B01J 20/32* (2006.01)
  *D06B 5/22* (2006.01)
  *D06M 11/20* (2006.01)
  *D06M 13/335* (2006.01)
  *D06M 101/10* (2006.01)
  *D06M 101/20* (2006.01)
  *D06M 101/26* (2006.01)
  *D06M 101/28* (2006.01)
  *D06M 101/32* (2006.01)
  *D06M 101/34* (2006.01)
  *D06M 101/38* (2006.01)

(52) U.S. Cl.
  CPC ....... *B01J 20/28033* (2013.01); *B01J 20/321* (2013.01); *B01J 20/3212* (2013.01); *B01J 20/3219* (2013.01); *B01J 20/3265* (2013.01); *D06B 5/22* (2013.01); *D06M 11/20* (2013.01); *D06M 13/335* (2013.01); *A62D 2101/02* (2013.01); *A62D 2101/26* (2013.01); *D06M 2101/10* (2013.01); *D06M 2101/20* (2013.01); *D06M 2101/26* (2013.01); *D06M 2101/28* (2013.01); *D06M 2101/32* (2013.01); *D06M 2101/34* (2013.01); *D06M 2101/38* (2013.01); *D10B 2201/02* (2013.01); *D10B 2321/022* (2013.01); *D10B 2321/08* (2013.01); *D10B 2321/10* (2013.01); *D10B 2331/02* (2013.01); *D10B 2331/04* (2013.01); *D10B 2331/10* (2013.01)

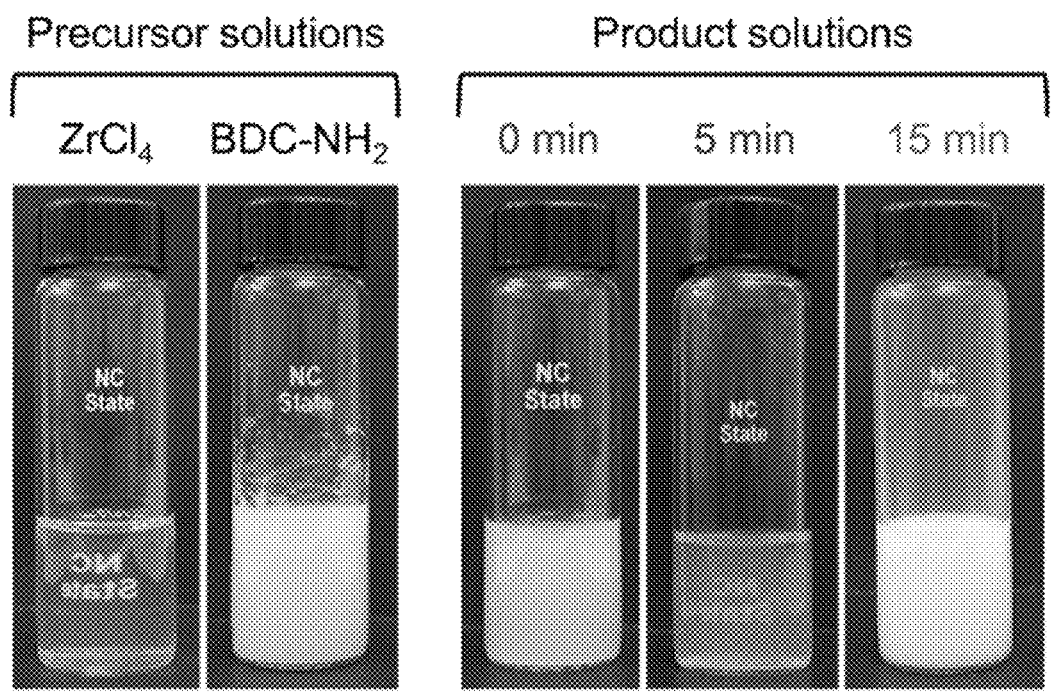
Fig. 1.1A
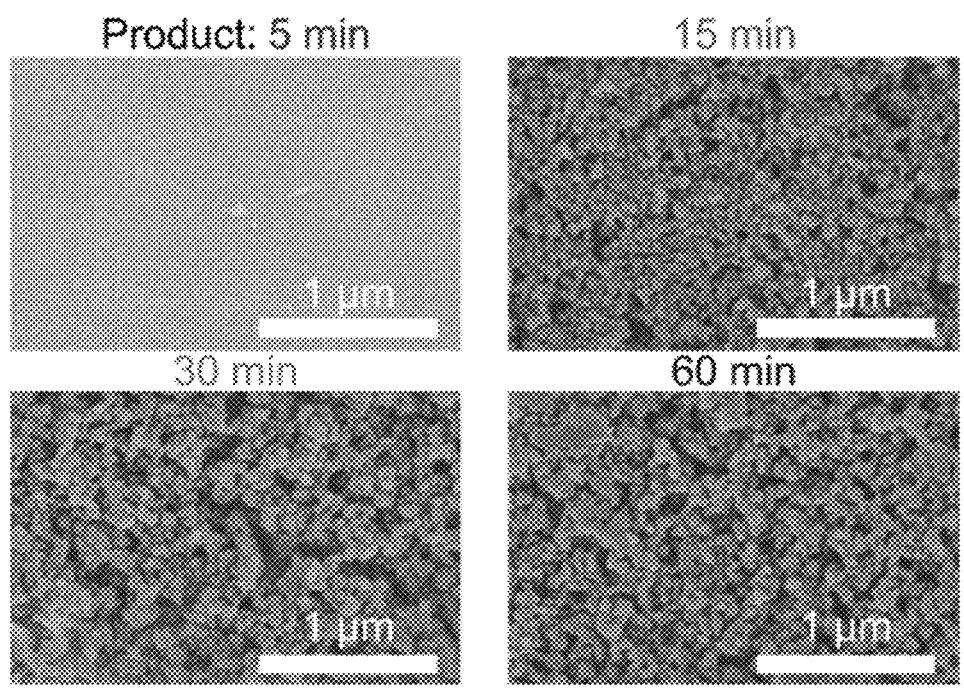
Fig. 1.1B

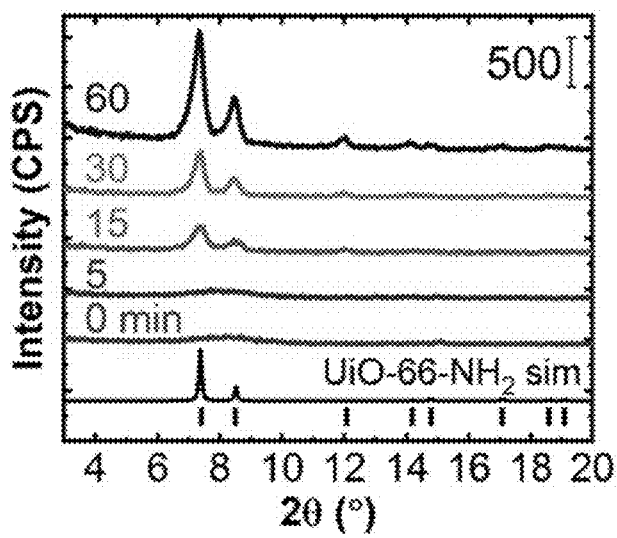
Fig. 1.1C
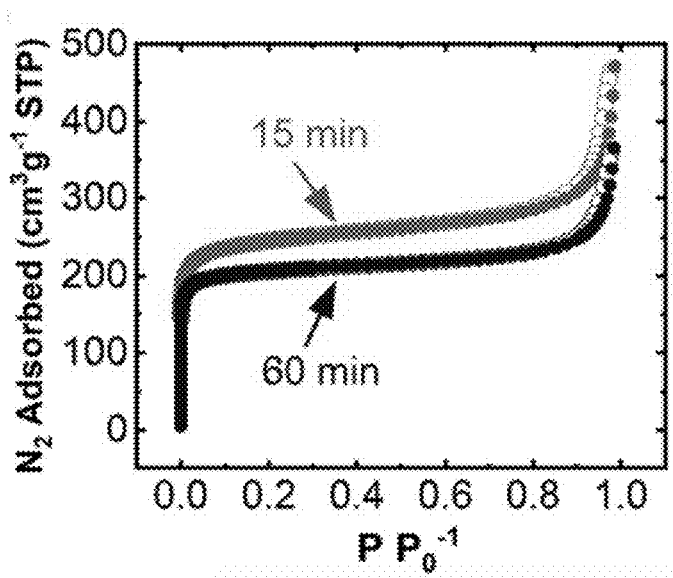
Fig. 1.1D
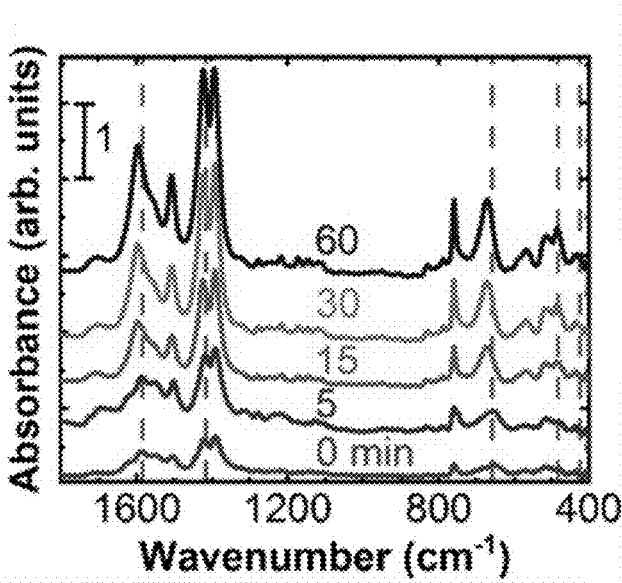
Fig. 1.1E

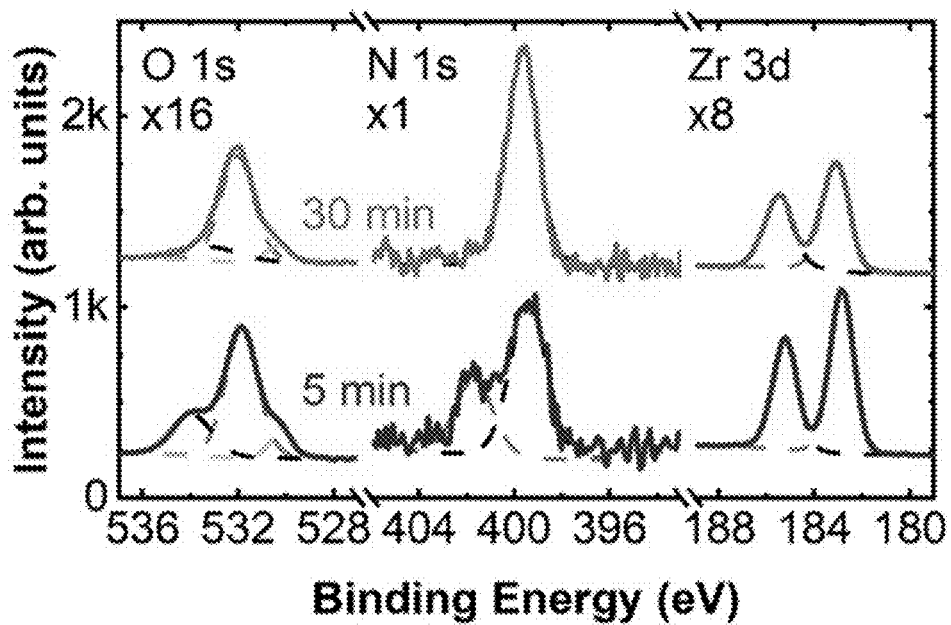
Fig. 1.1F
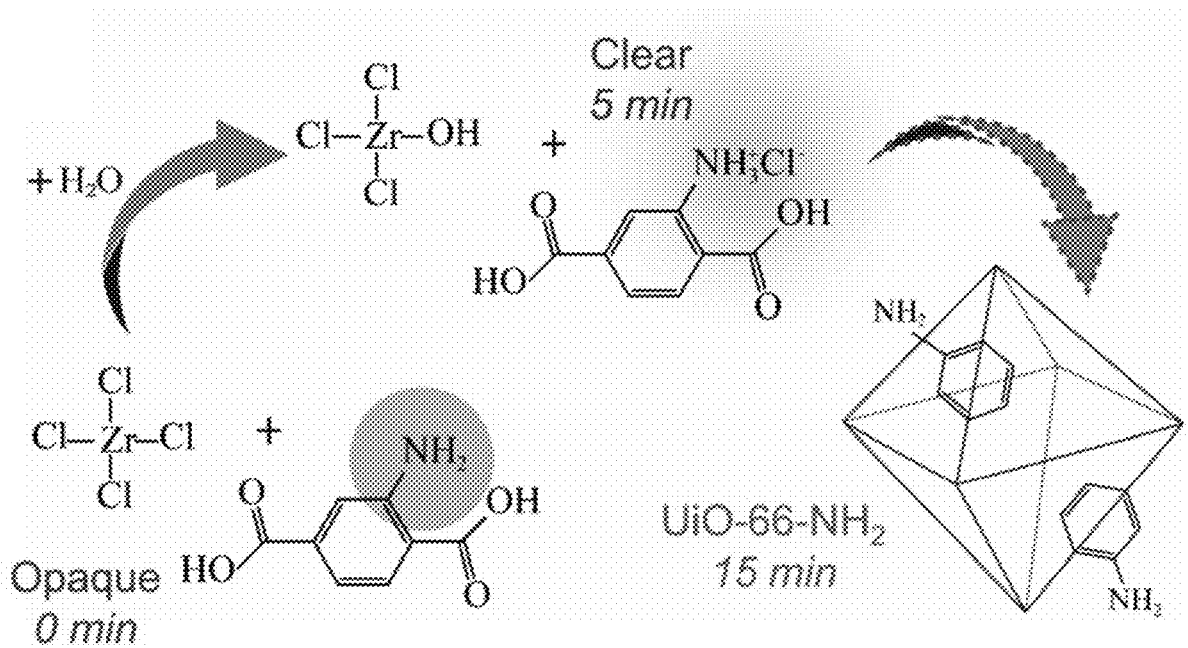
Fig. 1.1G

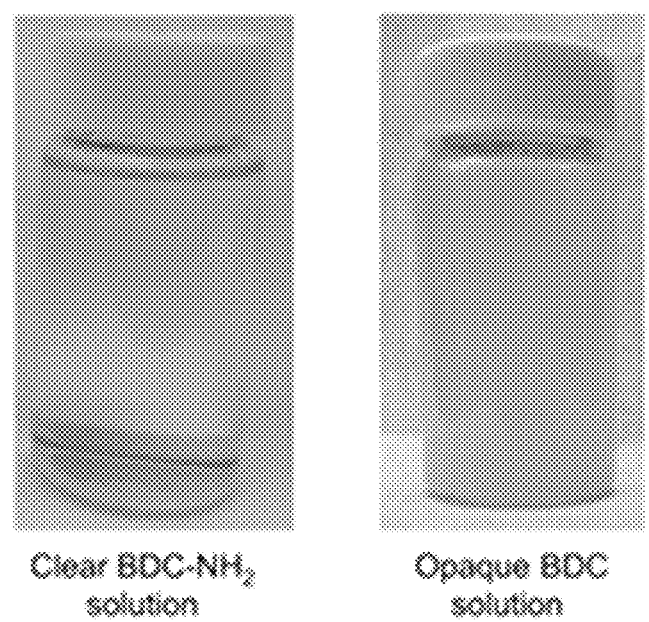
Fig. 1.1H
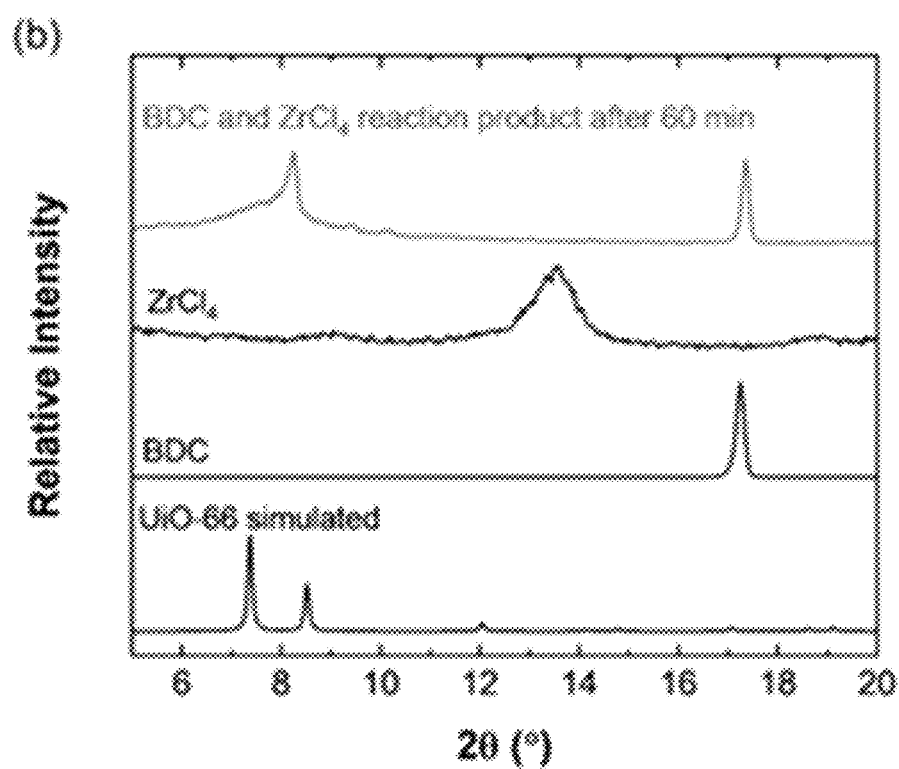
Fig. 1.1I

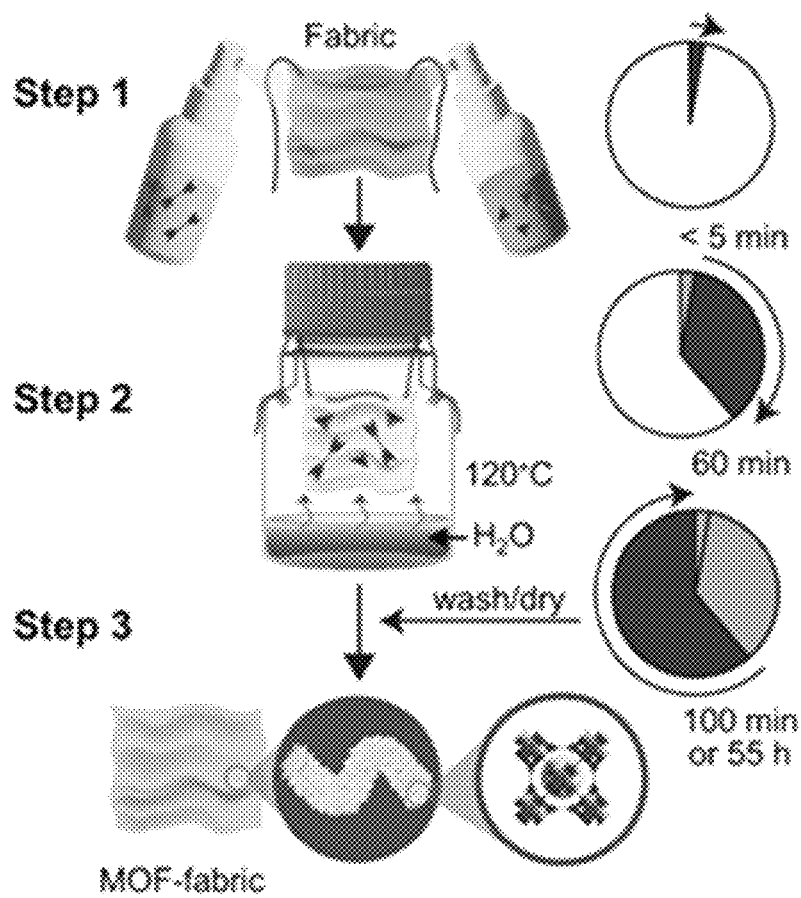
Fig. 1.2A
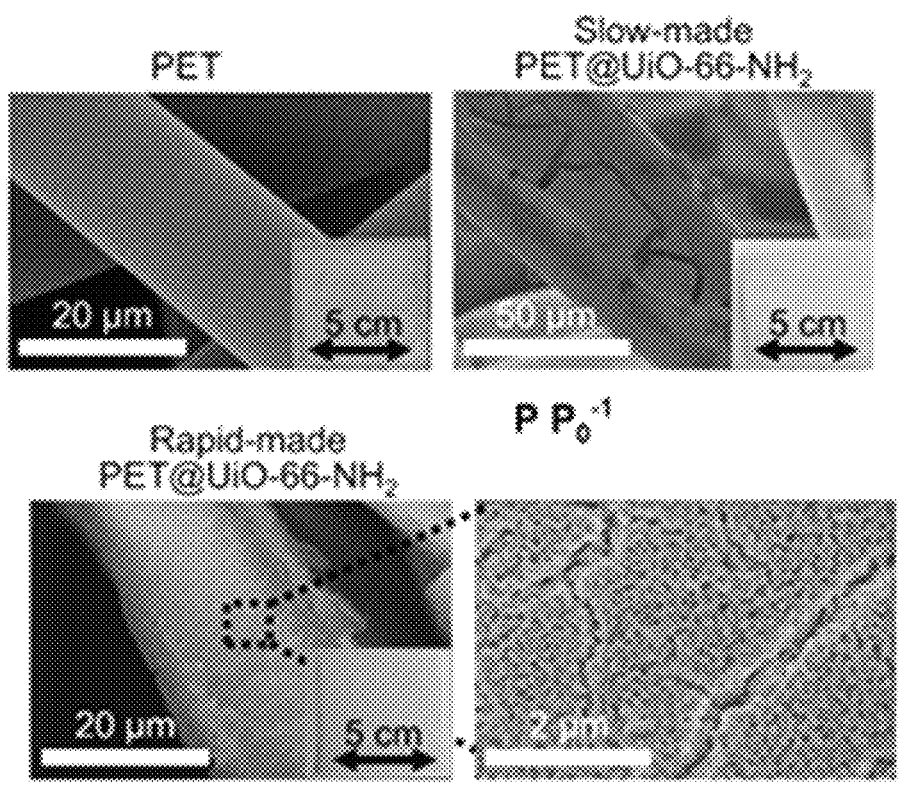
Fig. 1.2B

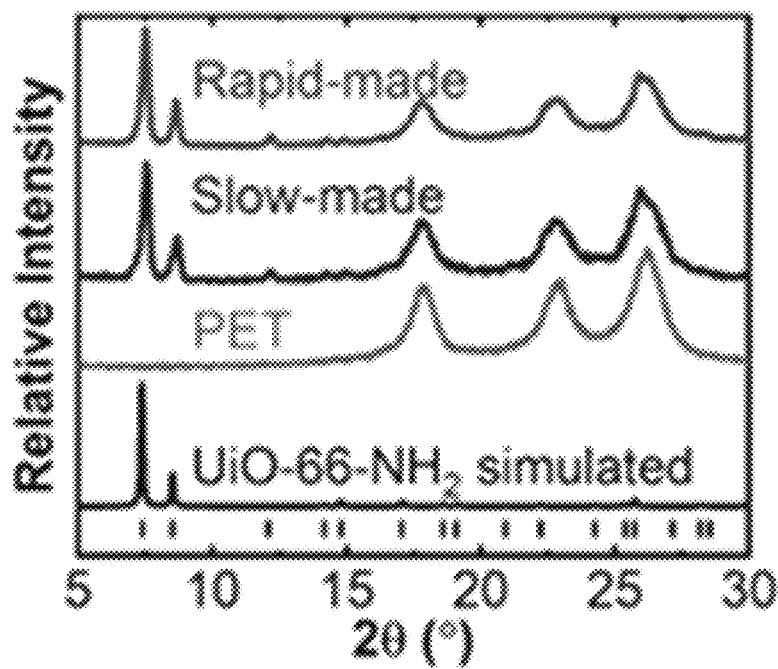
Fig. 1.2C
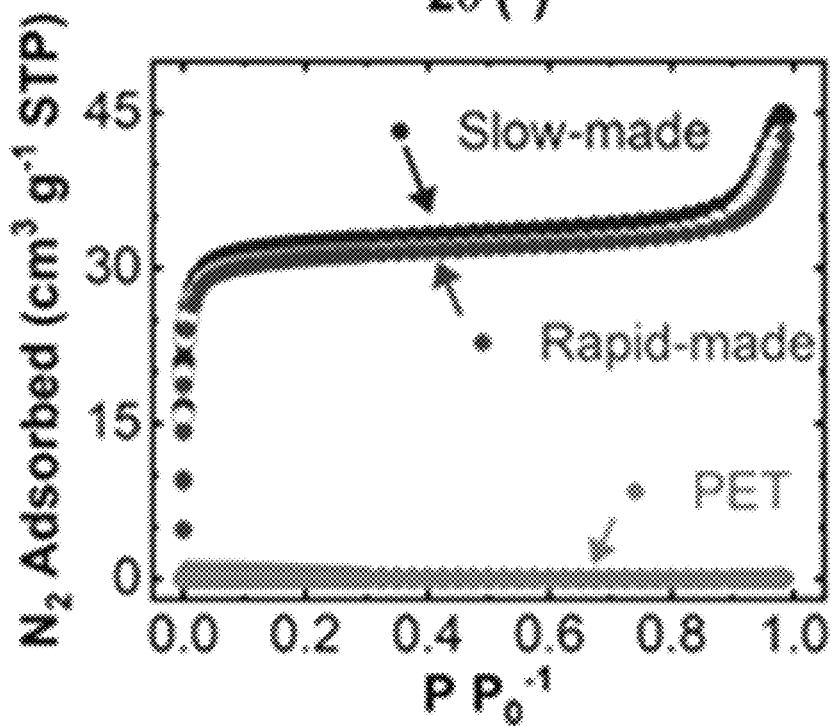
Fig. 1.2D

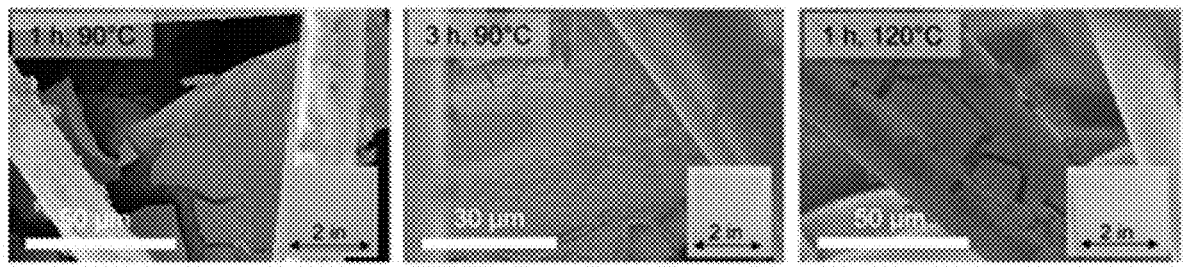
Fig. 1.2E
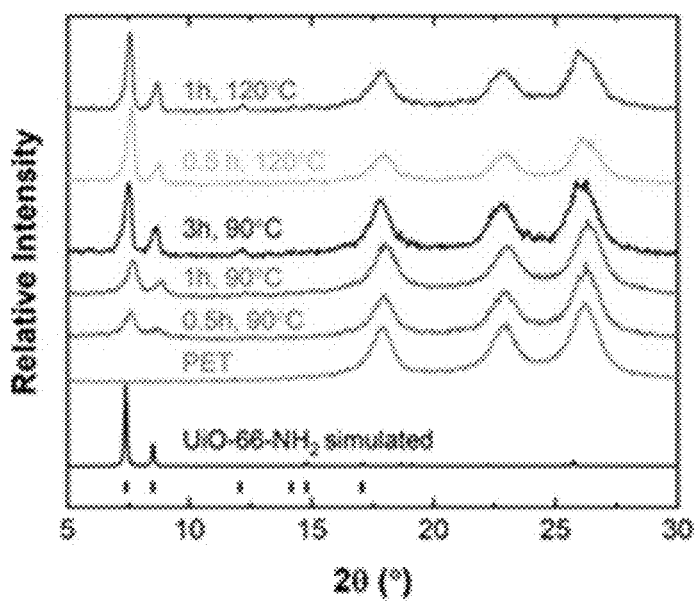
Fig. 1.2F
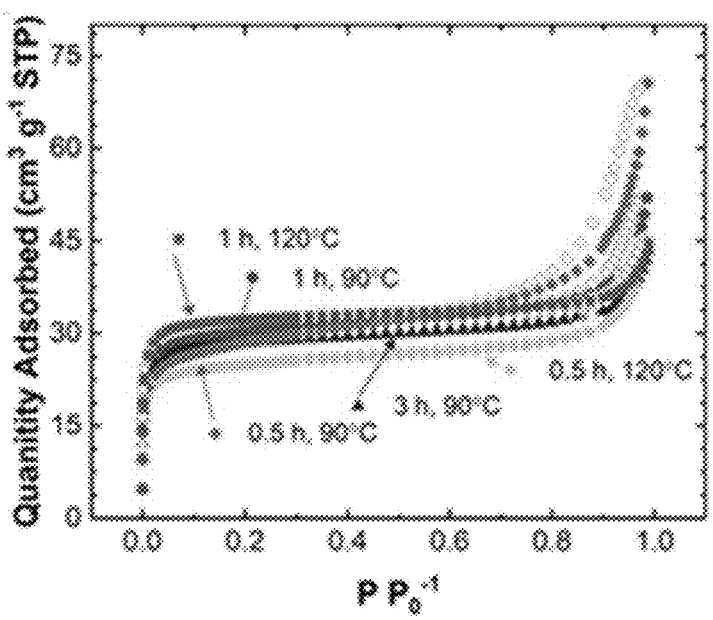
Fig. 1.2G

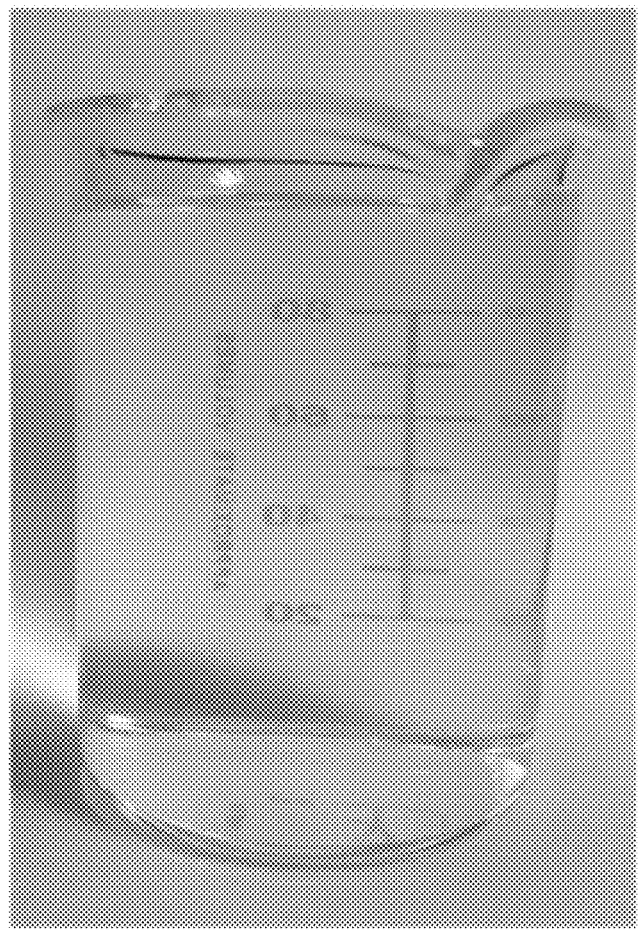
Fig. 1.3

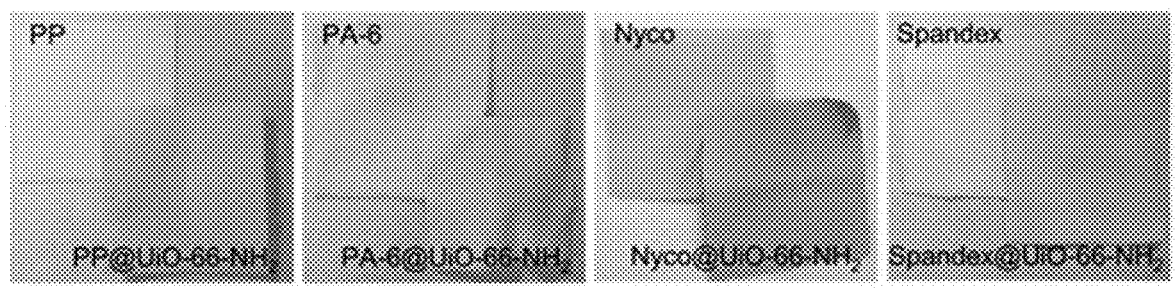
Fig. 1.4
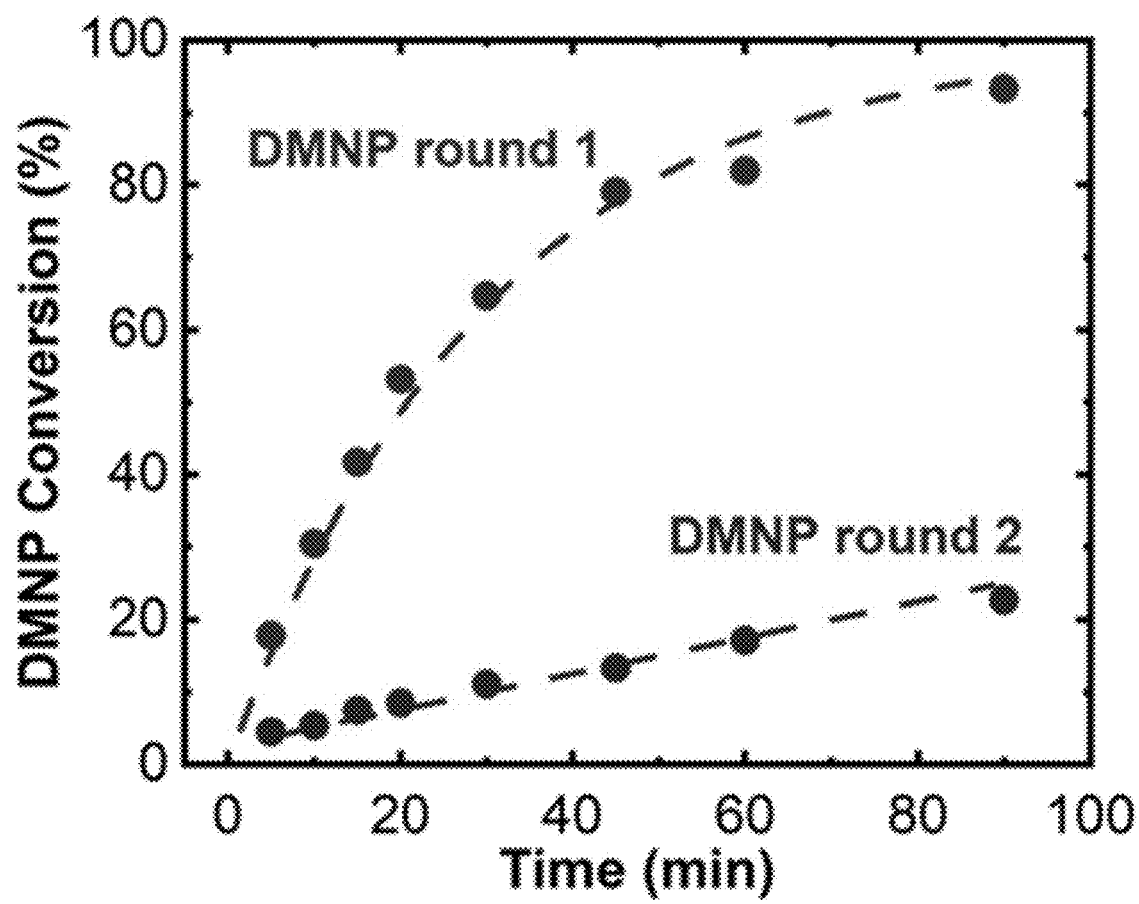
Fig. 1.5

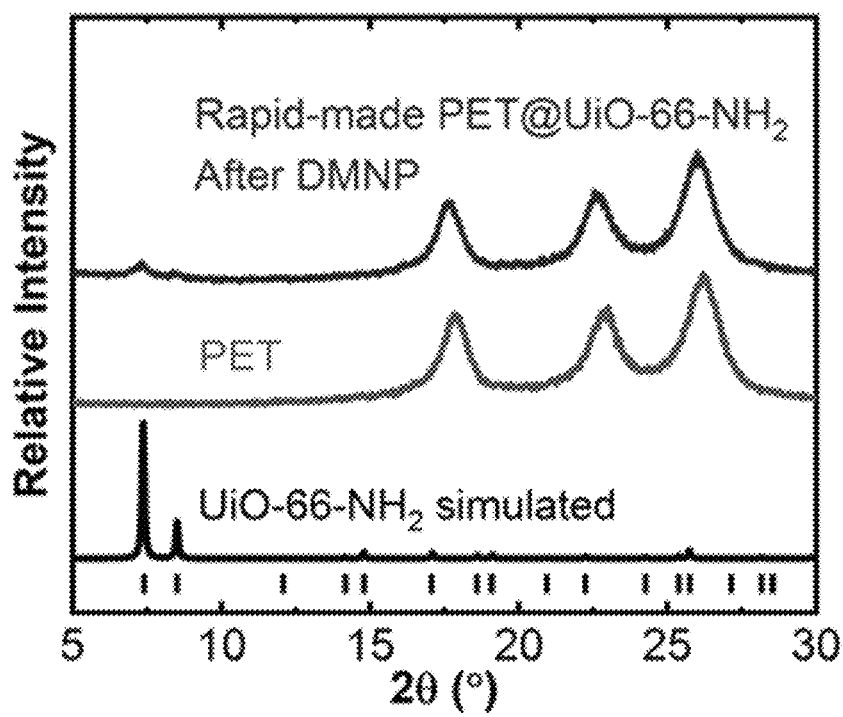
Fig. 1.6
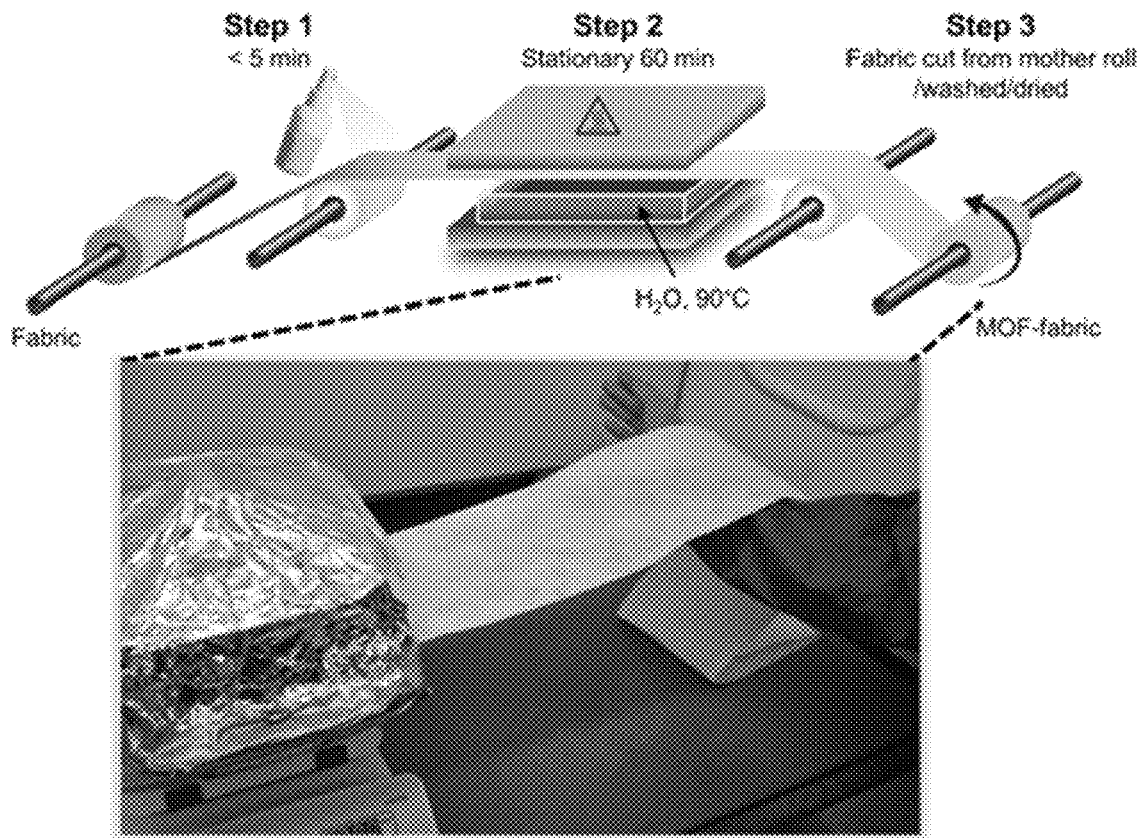
Fig. 1.7

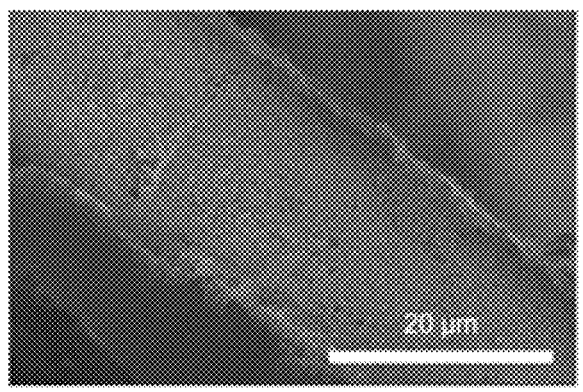
Fig. 1.8A
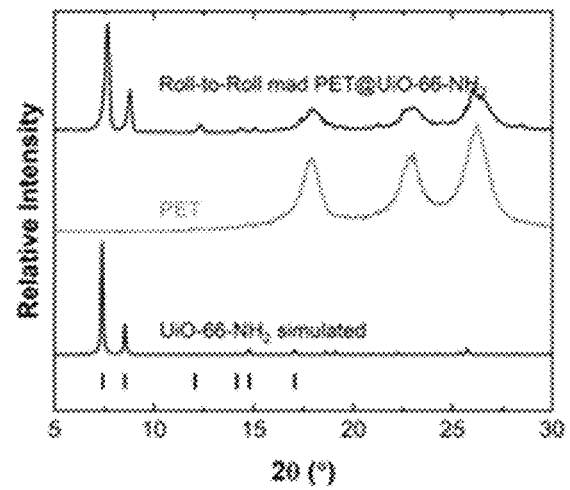
Fig. 1.8B
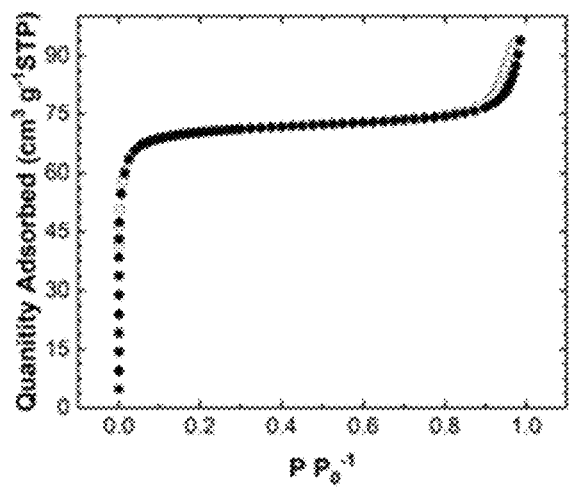
Fig. 1.8C
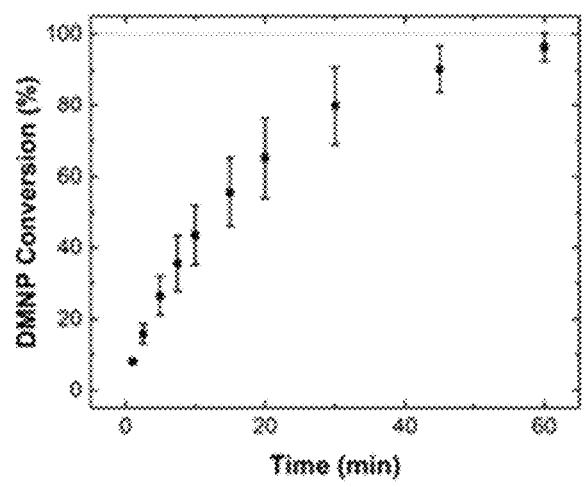
Fig. 1.8D

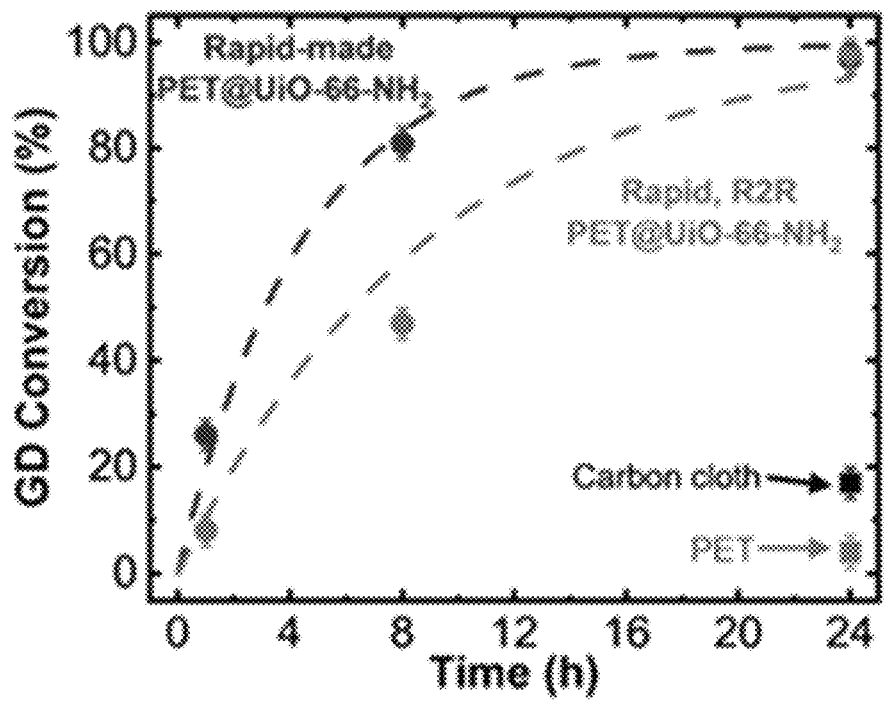
Fig. 1.9A
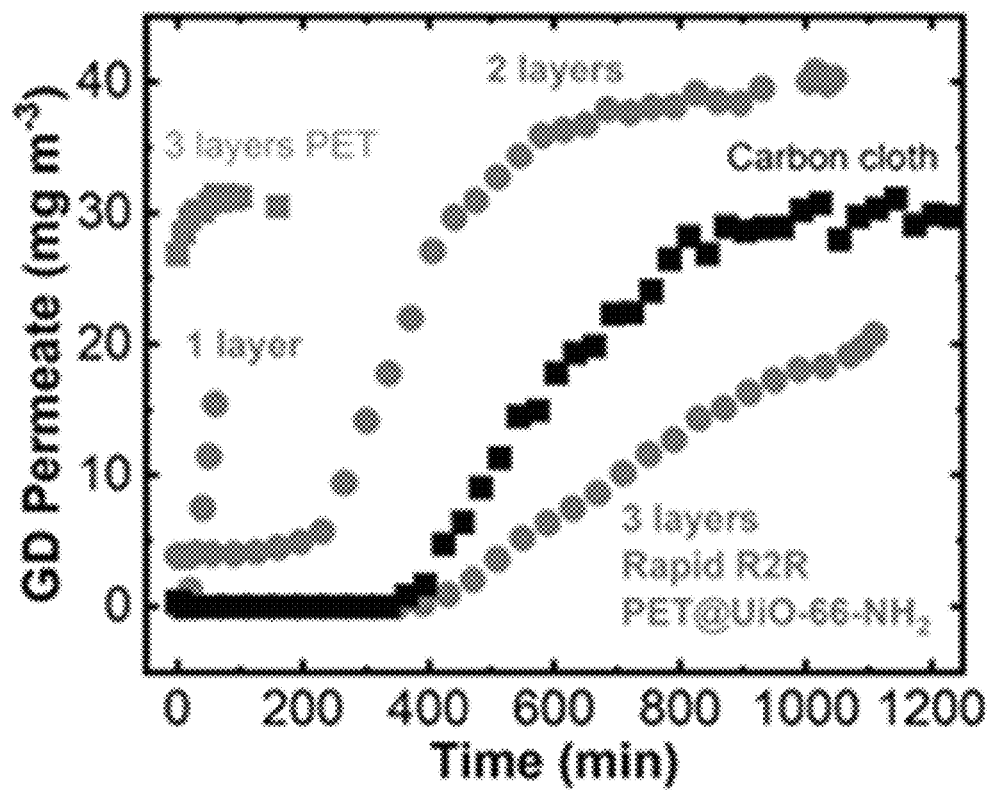
Fig. 1.9B

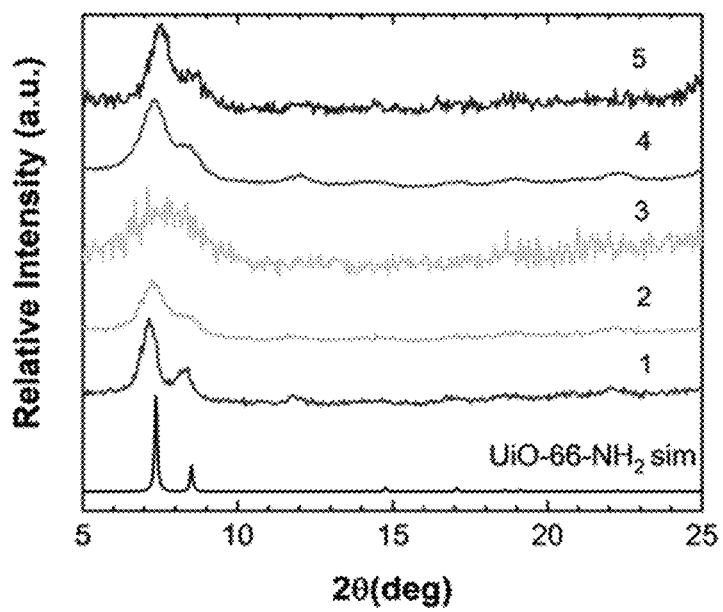
Fig. 2.1A
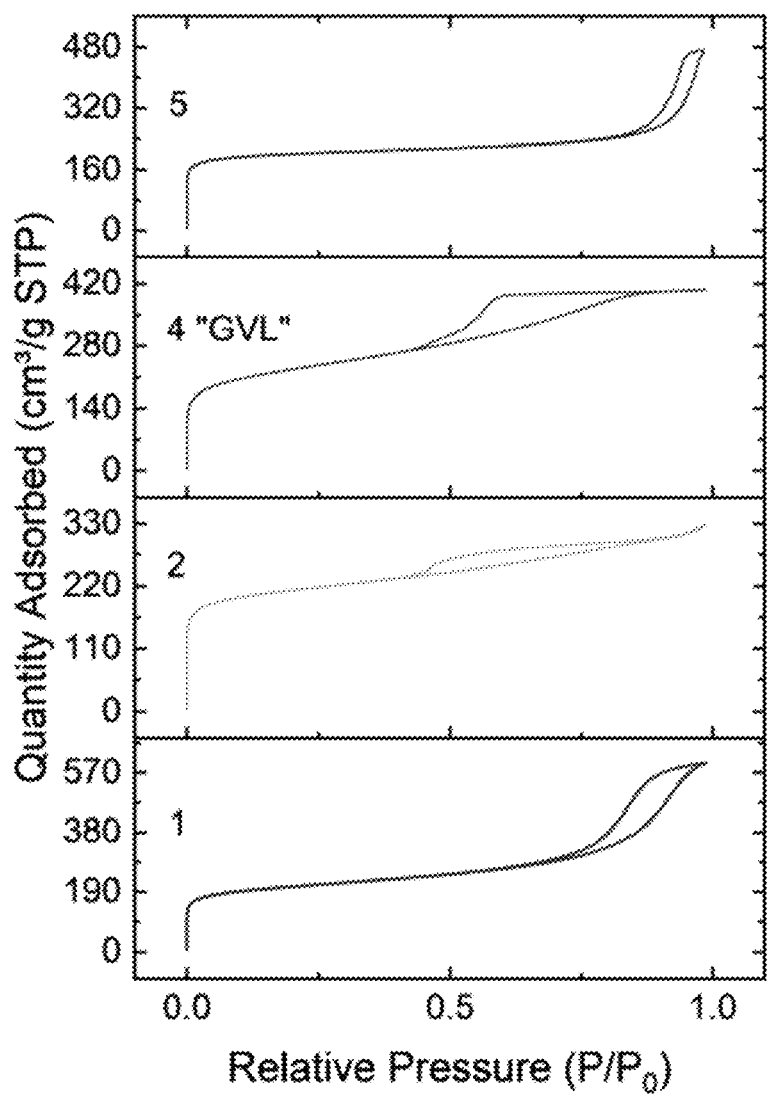
Fig. 2.1B

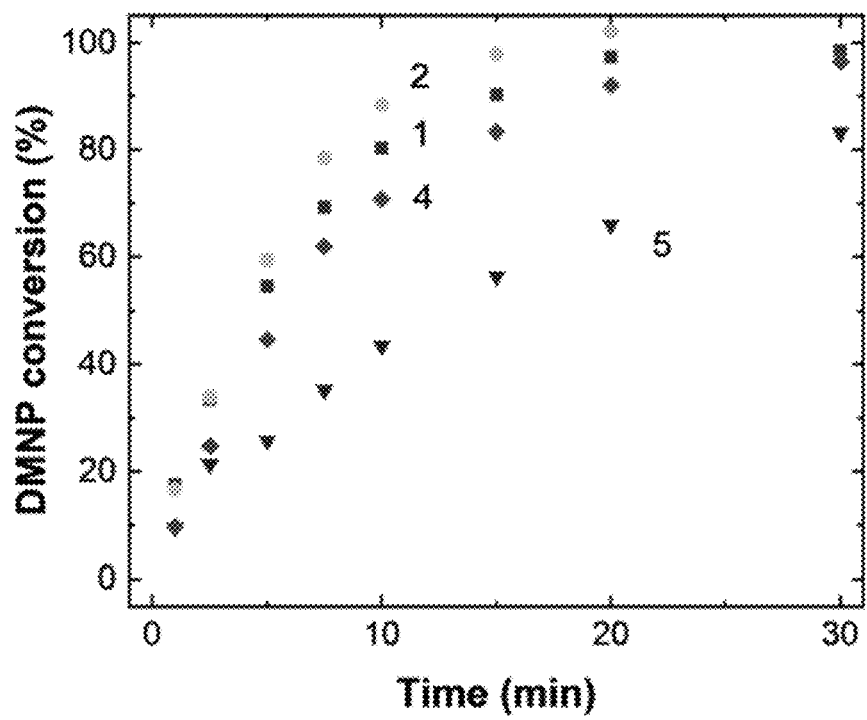
Fig. 2.1C
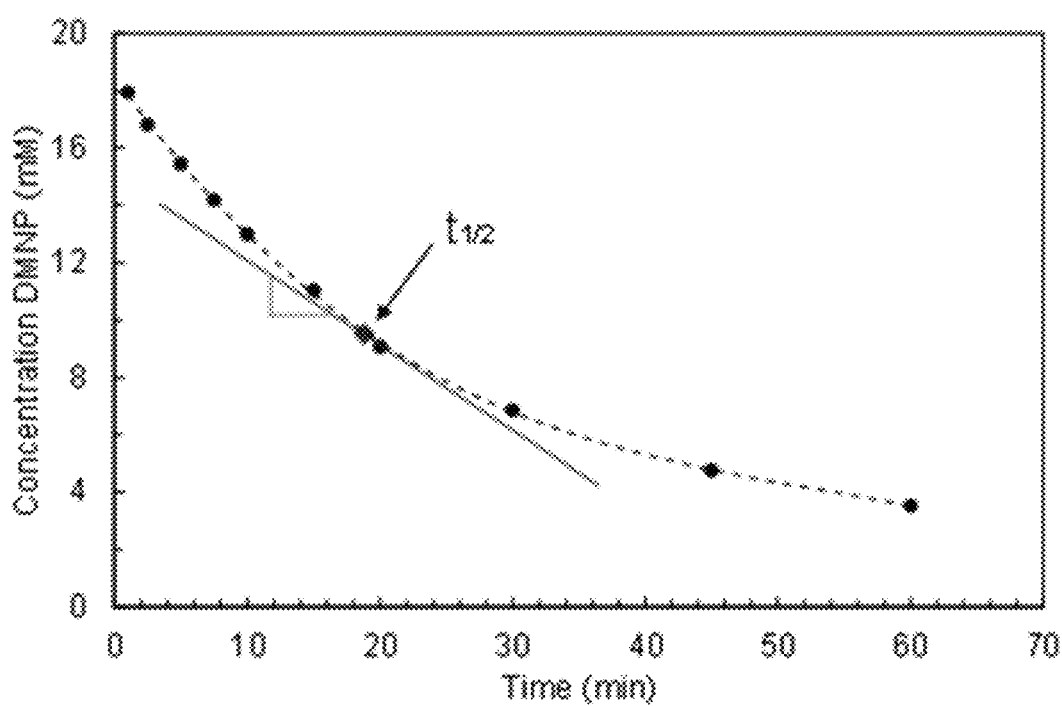
Fig. 2.1D

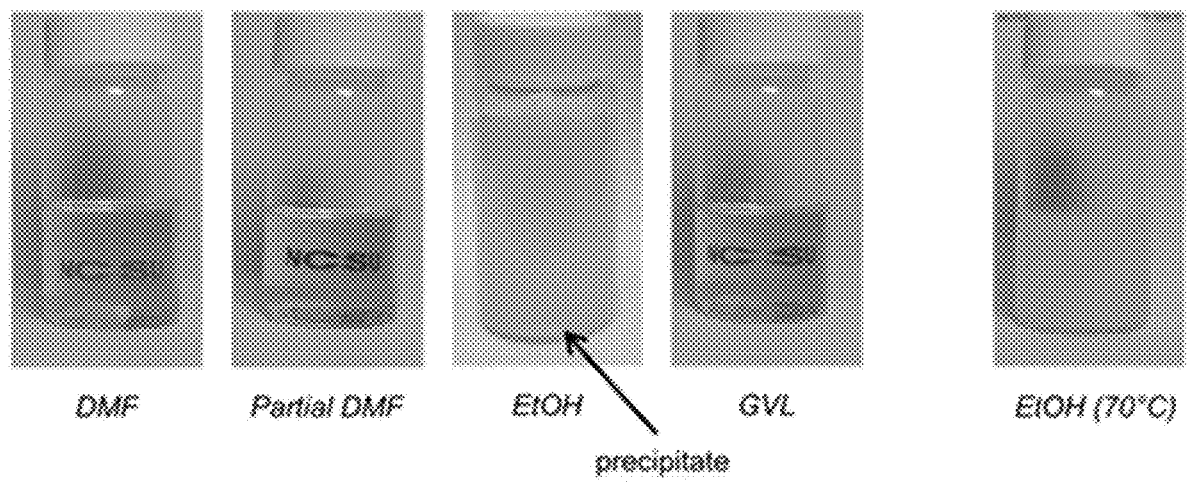
Fig. 2.2A    Fig. 2.2B
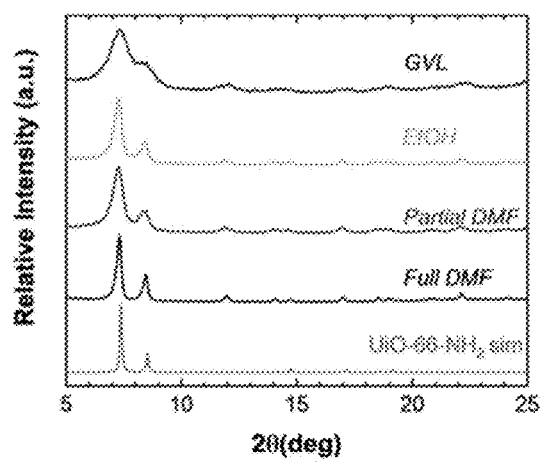
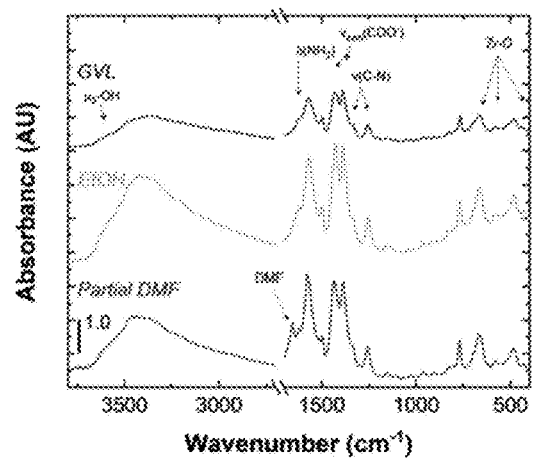
Fig. 2.3A    Fig. 2.3B

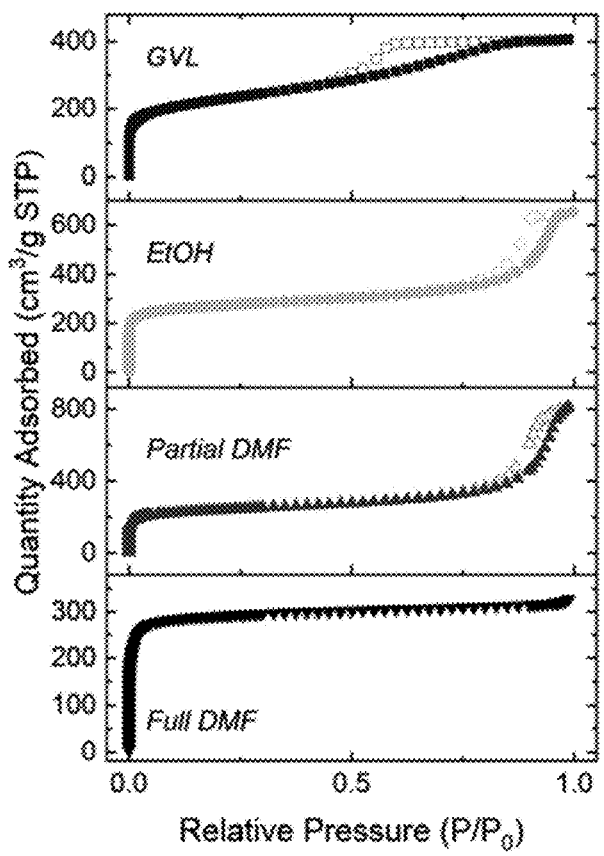
Fig. 2.3C
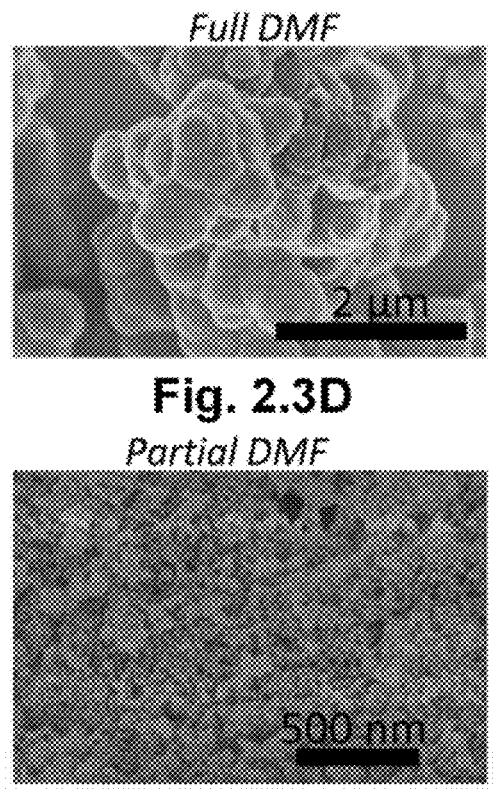
Fig. 2.3D
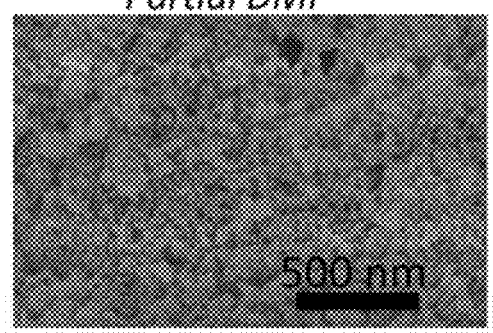
Fig. 2.3E
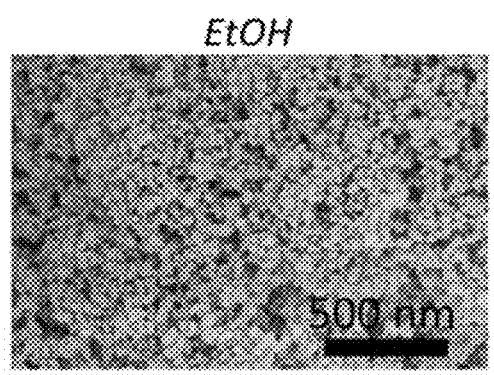
Fig. 2.3F
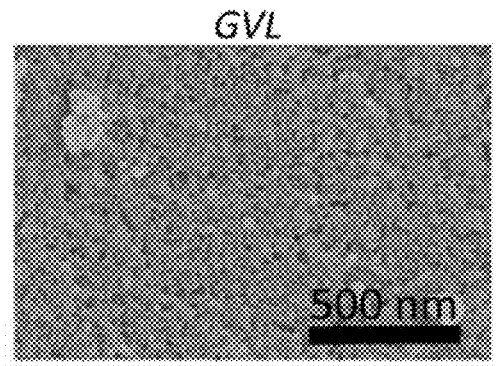
Fig. 2.3G

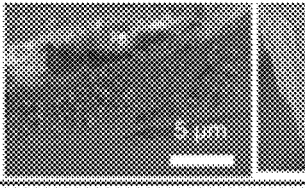
Fig. 2.3H

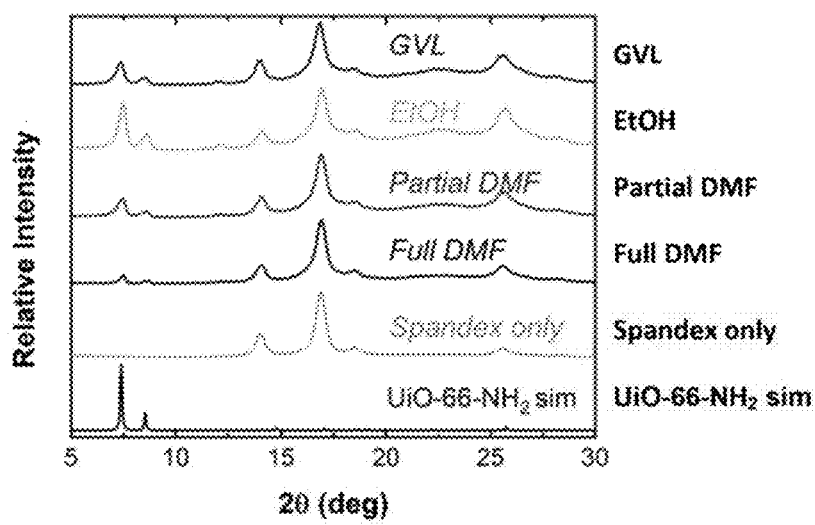
Fig. 2.4A
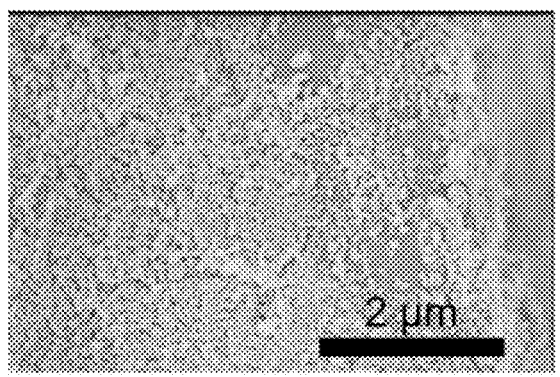
Fig. 2.4B
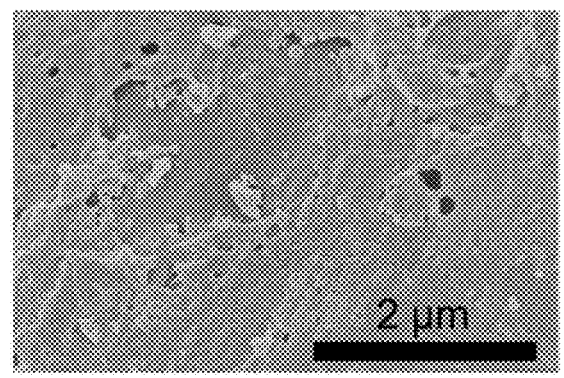
Fig. 2.4C
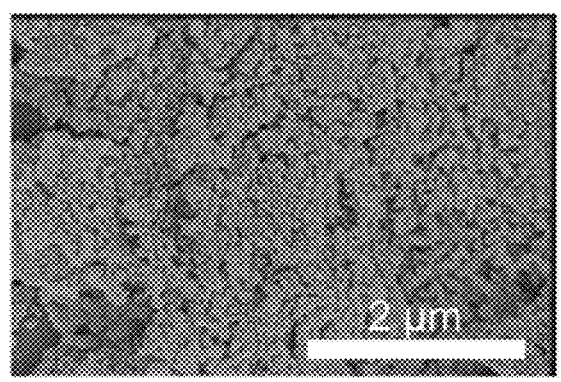
Fig. 2.4D

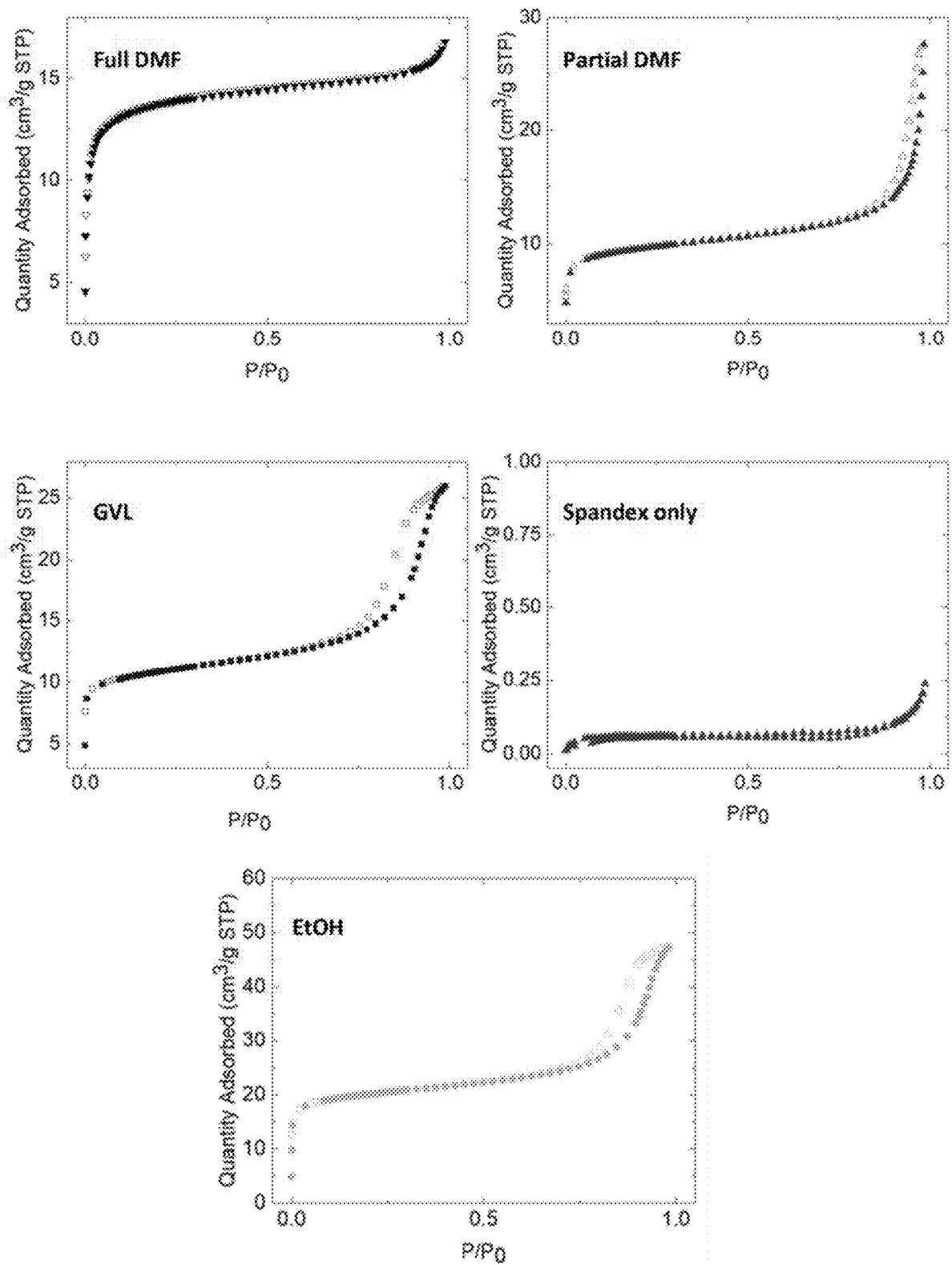
Fig. 2.4E

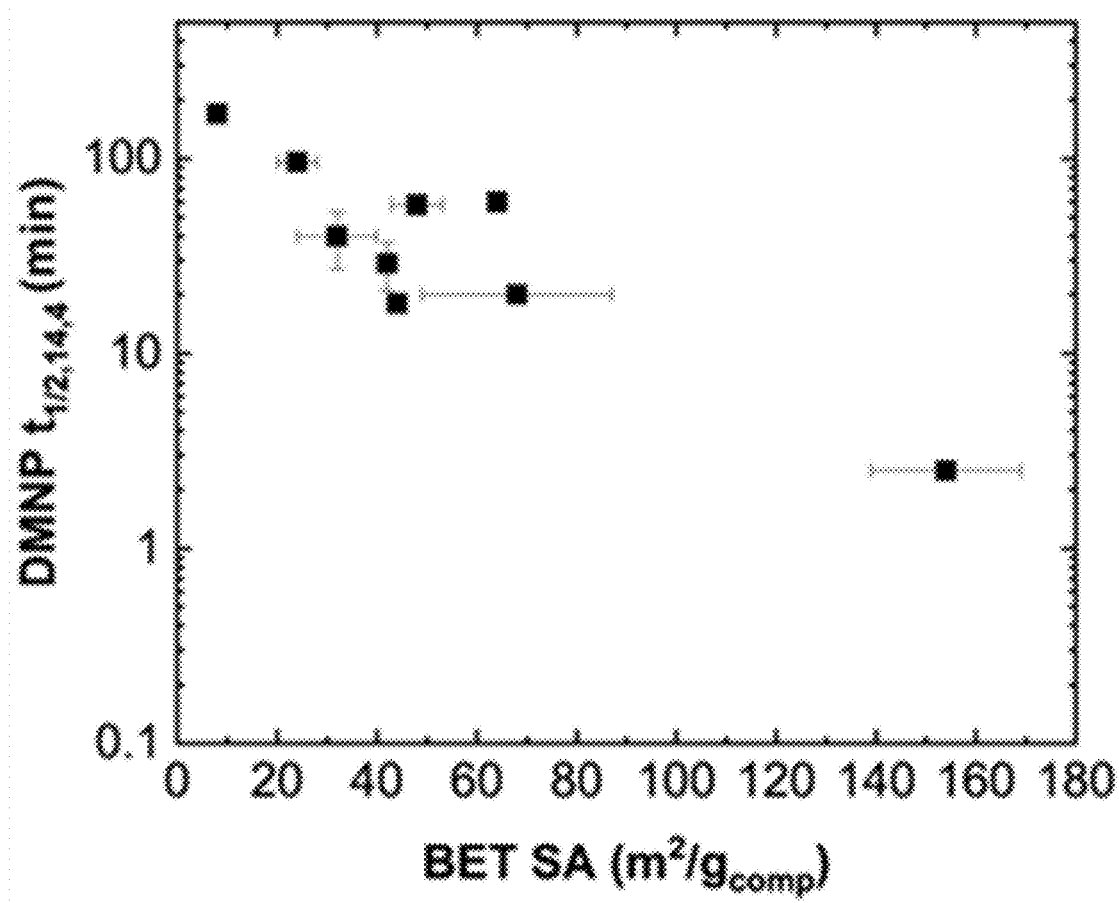
Fig. 2.5

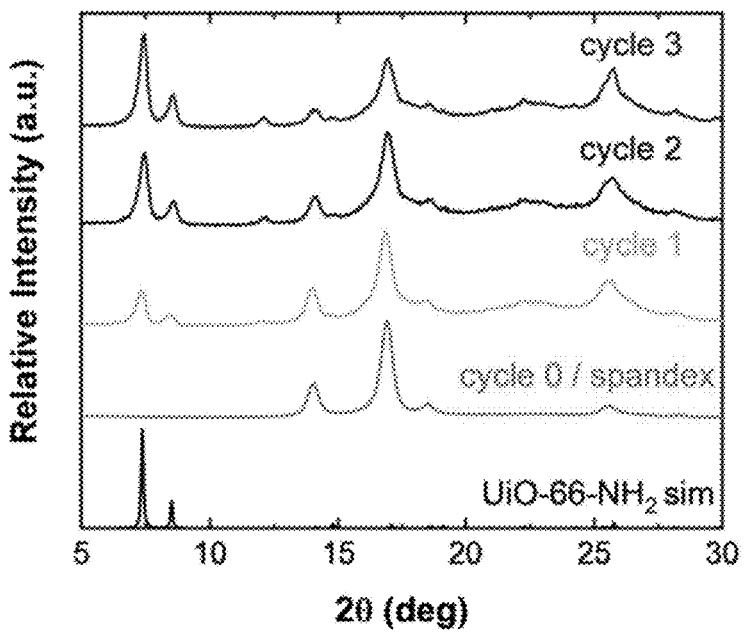
Fig. 2.6A
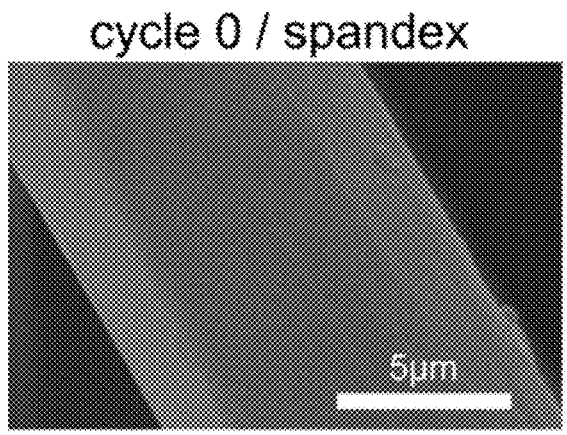
Fig. 2.6B
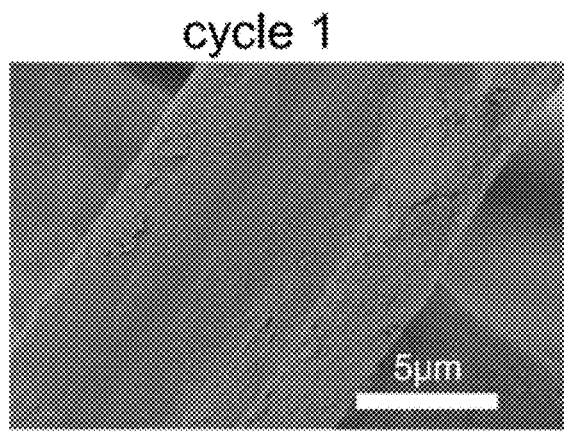
Fig. 2.6C
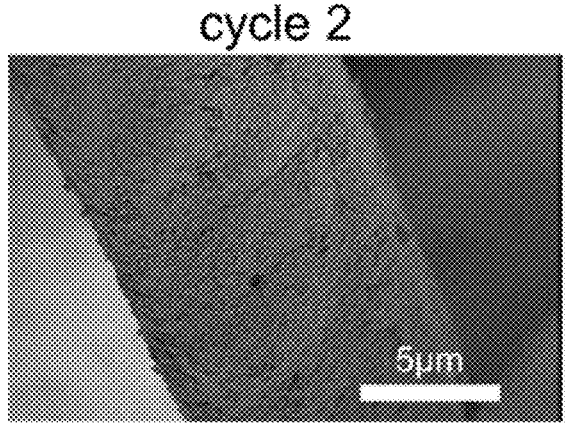
Fig. 2.6D
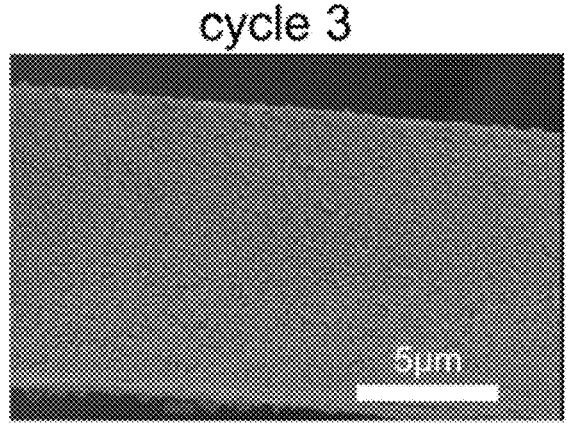
Fig. 2.6E

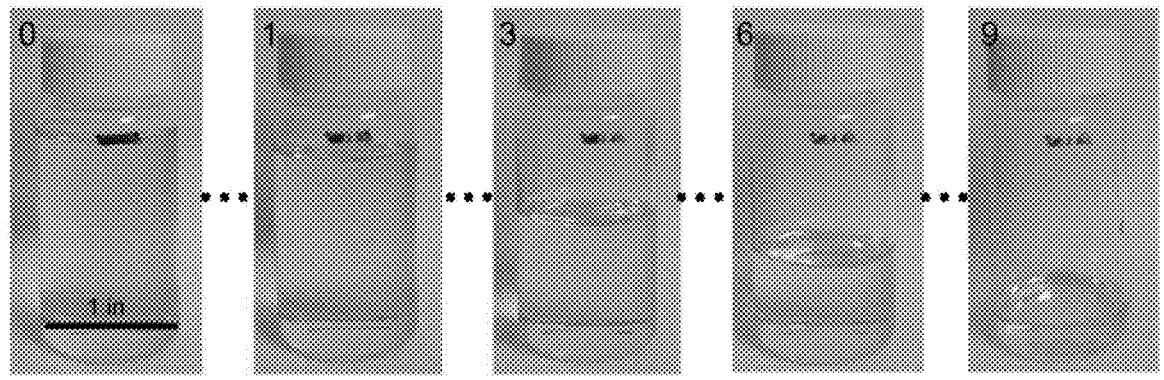
Fig. 2.7A
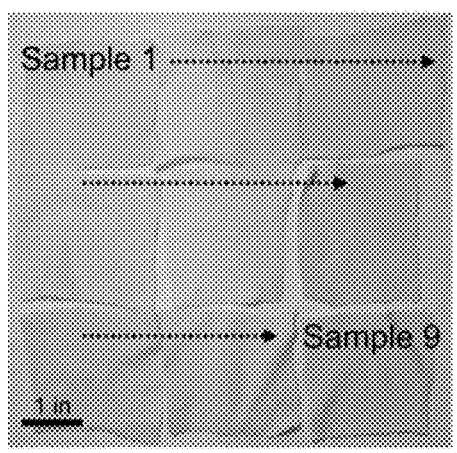
Fig. 2.7B
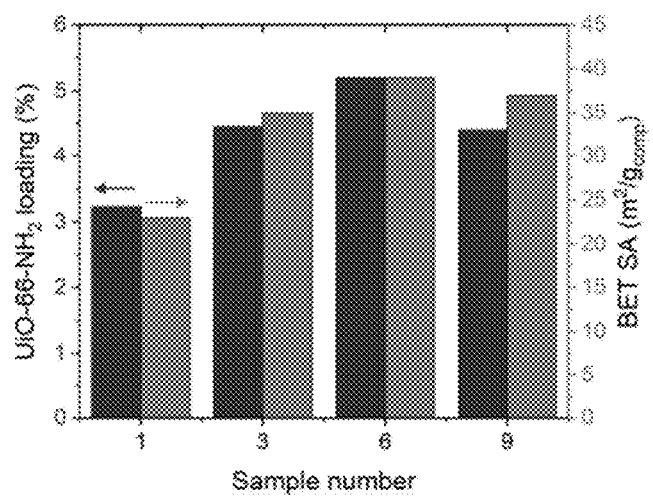
Fig. 2.7C
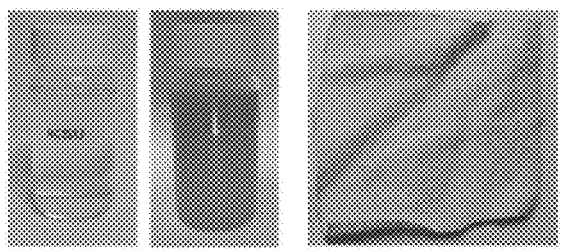
Fig. 2.8A  Fig. 2.8B
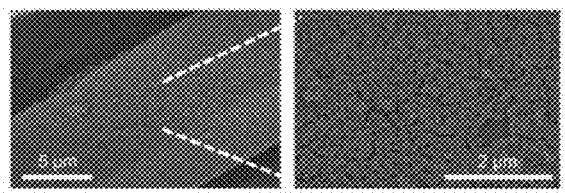
Fig. 2.8C

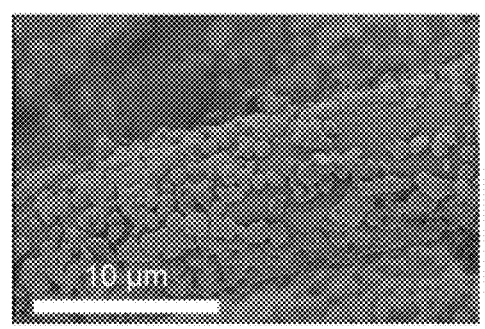
Fig. 2.8D
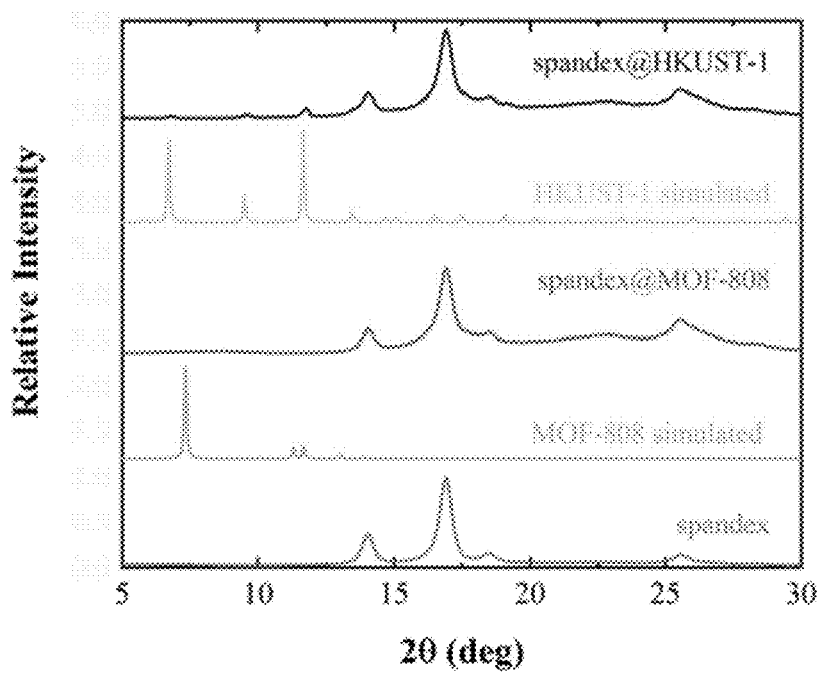
Fig. 2.8E
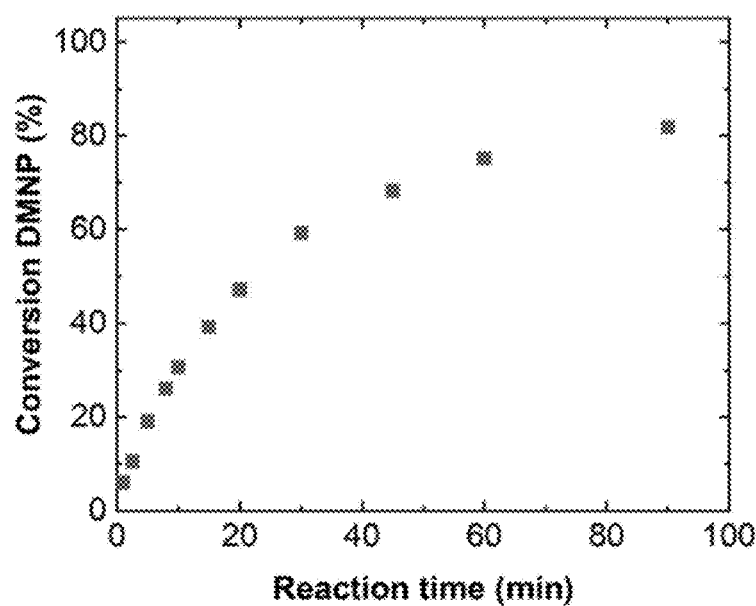
Fig. 2.8F

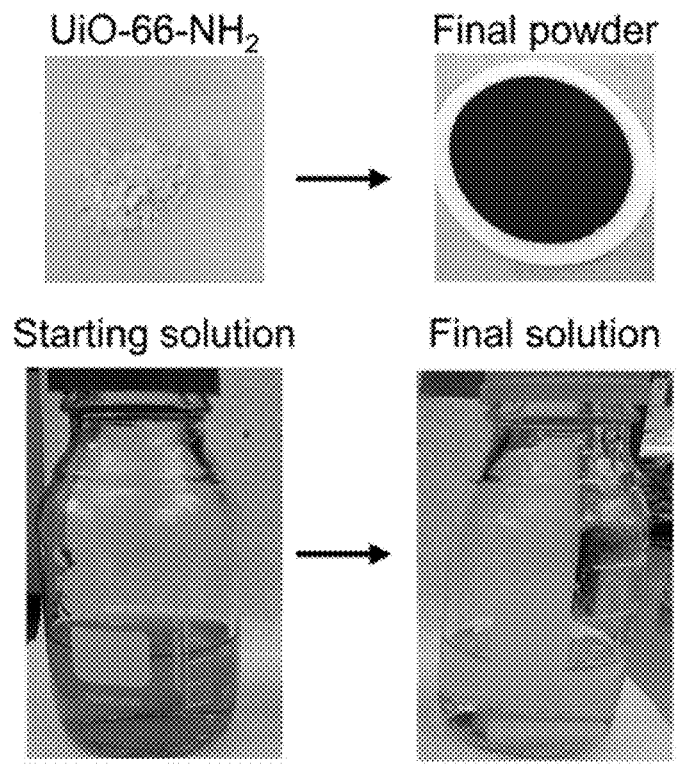
Fig. 2.9A
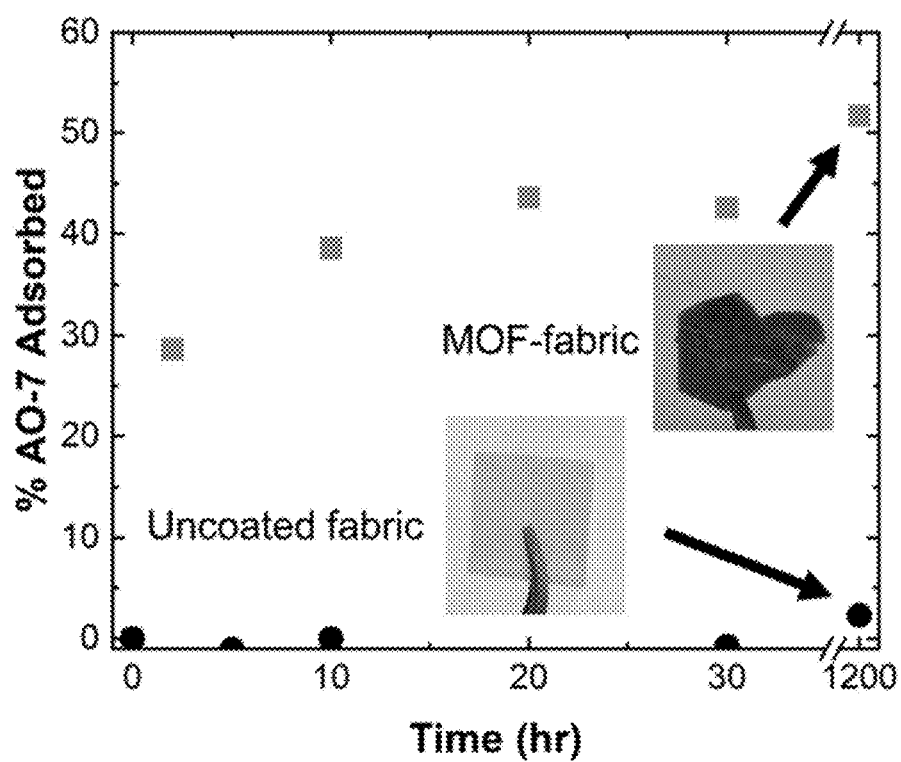
Fig. 2.9B

MOF-FABRIC COMPOSITES AND METHODS OF MOF-FABRIC COMPOSITE SYNTHESIS

CROSS-REFERENCE TO RELATED APPLICATIONS

This application claims the benefit of and priority to U.S. Provisional Application Ser. No. 63/279,923, having the title "MOF-FABRIC COMPOSITES AND METHODS OF MOF-FABRIC COMPOSITE SYNTHESIS", filed on Nov. 16, 2021, the disclosure of which is incorporated herein by reference in its entirety.

STATEMENT REGARDING FEDERALLY SPONSORED RESEARCH OR DEVELOPMENT

The present invention was made with United States government support under grant numbers W911NF-13-1-0173 and W911NF-19-2-0154 awarded by the U.S. Army Research Office. The United States government has certain rights in the invention.

BACKGROUND

MOF-fabric composites are important for coupling wide ranging MOF chemistry with portable, flexible substrates. However, current approaches to create zirconium-based metal-organic framework (MOF) fabric composites for catalysis, water purification, wound healing, gas sorption, and other applications often rely on toxic solvents, long reaction/post processing times, and batch methods hindering process scalability.

SUMMARY

Embodiments of the present disclosure provide MOF-fabric composites, products including MOF-fabric composites, methods of making MOF-fabric composites, and the like.

An embodiment of the present disclosure includes a method of making a metal organic framework (MOF)-fabric composite. The method includes introducing a solution to a fabric. The solution can include a metal salt, a linker, and a solvent. The method further includes absorbing the solution onto the fabric and suspending the fabric over a heated vapor for about 10 minutes to 24 hours. The modulator mixture releases vapor onto the fabric, causing the metal salt, the linker, and the solvent to diffuse out of the polymer fibers. The linker links metal in the metal salts to form crystals attached to the fabric, and the vapor aids in crystallization. An embodiment of the present disclosure also includes a metal organic framework (MOF)-fabric composite comprising a fabric having a crystalline MOF adhered directly to fibers of the fabric.

Other compositions, apparatus, methods, features, and advantages will be or become apparent to one with skill in the art upon examination of the following drawings and detailed description. It is intended that all such additional compositions, apparatus, methods, features, and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1.1A provides optical images of UiO-66-$NH_2$ precursor and product solutions; FIG. 1.1B SEM images of the product solution; FIG. 1.1C shows XRD of UiO-66-$NH_2$ powder products; FIG. 1.1D shows $N_2$ isotherms of UiO-66-$NH_2$ powder products, FIG. 1.1E shows FTIR spectra of UiO-66-$NH_2$ powder products, and FIG. 1.1F shows XPS spectra of UiO-66-$NH_2$ powder products; FIG. 1.1G shows a proposed mechanism for BDC-$NH_2$ solvation by HCl. FIG. 1.1H provides optical images of BDC-$NH_2$ and BDC dissolved in heated $H_2O$/HOAc/EtOH/HCl solution; FIG. 1.1I shows XRD of BDC and $ZrCl_4$ powder and dried reaction product of BDC and $ZrCl_4$.

FIG. 1.2A is a schematic of source separated sorption-vapor synthesis of MOF-fabric; FIG. 1.2B provides SEM images, FIG. 1.2C provides XRD, and FIG. 1.2D provides $N_2$ isotherms of PET and slow- and rapid-made PET@UiO-66-$NH_2$. FIG. 1.2E, SEM images; FIG. 1.2F, XRD patterns; and FIG. 1.2G, $N_2$ isotherms of slow-made PET@UiO-66-$NH_2$ made with various vapor exposure times and temperatures.

FIG. 1.3 is an optical image of EtOH after being used to wash PET@UiO-66-$NH_2$.

FIG. 1.4 provides images of rapid-made fabric@UiO-66-$NH_2$.

FIG. 1.5 shows round 1 and round 2 DMNP conversion with rapid-made PET@UiO-66-$NH_2$.

FIG. 1.6 shows XRD of rapid-made PET@UiO-66-$NH_2$ after DMNP hydrolysis.

FIG. 1.7 shows roll-to-roll production system for MOF-fabric and roll-to-roll made PET@UiO-66-$NH_2$ in accordance with embodiments of the present disclosure.

FIGS. 1.8A-1.8D relate to roll-to-roll made PET@UiO-66-$NH_2$. FIG. 1.8A, SEM image; FIG. 1.8B, XRD pattern; FIG. 1.8C, $N_2$ isotherm; and FIG. 1.8D, DMNP conversion plot.

FIGS. 1.9A-1.9B provide soman (GD) (FIG. 1.9A) hydrolysis and (FIG. 1.9B) permeation tests with carbon cloth, PET, and PET@UiO-66-$NH_2$. The dashed lines in panel (FIG. 1.9A) are exponential trend lines drawn as a guide to the eye. For the GD conversion data, error bars correspond to a predicted ±3%, obtained when experiments are repeated on a duplicate sample.

FIGS. 2.1A-2.1C provide conversion plots for UiO-66-$NH_2$ powder: (2.1A) XRD, (2.1B) $N_2$ isotherms, and (2.1C) DMNP. FIG. 2.1D shows a plot of the calculation of DMNP $TOF_{t1/2}$.

FIG. 2.2A is a camera image showing solubility of 0.127 M BDC-$NH_2$ with 0.137 M $ZrCl_4$ in RT solvent systems and FIG. 2.2B shows EtOH heated to 70° C.

FIG. 2.3A shows XRD; FIG. 2.3B shows FTIR spectra; and FIG. 2.3C shows $N_2$ isotherms of UiO-66-$NH_2$, solid symbols indicate adsorption, open symbols indicate desorption; SEM images of UiO-66-$NH_2$ powder made with (FIG. 2.3D) DMF, (FIG. 2.3E) partial DMF, (FIG. 2.3F) EtOH, and (FIG. 2.3G) GVL. FIG. 2.3H provides a comparison of SEM images of fiber@UiO-66-$NH_2$ composites reported.

FIG. 2.4A provides XRD of spandex and spandex@UiO-66-$NH_2$; SEM images of spandex@UiO-66-$NH_2$ made with partial DMF (FIG. 2.4B), EtOH (FIG. 2.4C), GVL (FIG. 2.4D), $N_2$ isotherms of spandex and spandex@UiO-66-$NH_2$ composites (FIG. 2.4E). Solid symbols indicate adsorption, open symbols indicate desorption.

FIG. 2.5 graphs fabric@UiO-66-$NH_2$ DMNP $t_{1/2,14,4}$ versus composite BET SA. Where present, error bars represent standard deviation of triplicate date sets.

FIG. 2.6A shows XRD of spandex, spandex@UiO-66-NH$_2$—C1, and spandex@UiO-66-NH$_2$—C3. SEM images of (FIG. 2.6B) spandex, (FIG. 2.6C) spandex@UiO-66-NH$_2$—C1, (FIG. 2.6D) spandex@UiO-66-NH$_2$—C2, and (FIG. 2.6E) spandex@UiO-66-NH$_2$—C3.

FIG. 2.7A is a camera image of a partial DMF precursor solution; FIG. 2.7B are camera images of samples 1-9 of partial DMF spandex@UiO-66-NH$_2$ scaling experiment;

FIG. 2.7C shows UiO-66-NH$_2$ loading and composite BET SA of samples 1, 3, 6, and 9 partial DMF spandex@UiO-66-NH$_2$ scaling experiment.

FIG. 2.8A shows HKUST-1 and MOF-808 precursor dissolution in GVL; FIG. 2.8B is an optical image of spandex@HKSUT-1; FIG. 2.8C-2.8D are SEM images of spandex@HKUST-1 and spandex@MOF-808, respectively; FIG. 2.8E is an XRD pattern of spandex@HKUST-1 and spandex@MOF-808; FIG. 2.8F shows a DMNP conversion plot for spandex@MOF-808.

FIG. 2.9A shows UiO-66-NH$_2$ powder and AO-7 solution before and after dye adsorption experiment; FIG. 2.9B. shows AO-7 adsorption plot of uncoated fabric and MOF coated fabric.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art.

The following examples are put forth so as to provide those of ordinary skill in the art with a complete disclosure and description of how to perform the methods and use the materials disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

As used herein, the following terms have the meanings ascribed to them unless specified otherwise. In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

General Discussion

In accordance with the purpose(s) of the present disclosure, as embodied and broadly described herein, embodiments of the present disclosure, in some aspects, relate to metal organic framework (MOF)-fabric composites, products including MOF-fabric composites, and methods of making MOF-fabric composites.

In general, embodiments of the present disclosure provide for methods of making MOF-fabric composites using low-boiling point solvents, continuous processing methods of making MOF-fabric composites, and products including MOF-fabric composites. Advantageously, unlike other MOF-fabric composites, no metal oxide layer or other adhesion layer is needed in the methods provided herein.

The process is faster and less expensive because no pretreatment of the fabric is needed as the MOF crystals adhere directly to the fabric.

The MOF-fabric composites described herein can capture and decompose toxic or undesirable chemicals including various organophosphates and chemical warfare agents (e.g. nerve agents); the composites can also absorb various toxic compounds such as ammonia.

The present disclosure includes a method of making a metal organic framework MOF-fabric composite. The method includes introducing a solution to a fabric, where the solution includes a metal salt, a linker, and a solvent. The solution is then absorbed onto the fabric. The method further includes suspending the fabric over a heated vapor such that the modulator mixture releases vapors onto the fabric. The metal salt, the linker, and the solvent diffuse out of the polymer fibers so that the linker links metal from the metal salts to form MOF crystals attached to the fabric and the vapors aid in crystallization. The fabric can be suspended over the vapor for about 10 minutes to 24 hours; about 30 minutes to 24 hours; about 3 hours to 12 hours; or about 10 minutes to 3 hours. Advantageously, the method employs environmentally benign solvents and produces the MOF-fabric more quickly and cost effectively than previous methods. The methods described herein eliminate the need for solvent exchange by using low-boiling point solvents.

In some embodiments, the method includes dissolving the linker in a first solvent mixture to form a first solution and the metal reagent in a second solvent mixture to form a second solution. The first solution and the second solution can be introduced separately to the fabric before the fabric is suspended over the vapor. Advantageously, adsorbing the solutions separately reduces premature homogeneous MOF nucleation. Additionally, a wider range of solvents can be chosen when the solutions are applied separately. Example solvents for the linker solution include water, ethanol, acetic acid, dimethylformamide, and γ-valerolactone. Example solvents for the metal solvent include ethanol, acetic acid, water, dimethylformamide, and γ-valerolactone.

In some embodiments, the solvents can include water, ethanol, acetic acid, and combinations thereof. Optionally, they can further include γ-valerolactone (GVL) or dimethylformamide (DMF). GVL and DMF aid in linker and metal dissoltuion and MOF crystalization but require longer reaction times to form the MOF than low boiling point solvents such as water, ethanol, and acetic acid. In some embodiments, where GVL is included in the solvent, the concentration of GVL is about 1 v/v % to 100 v/v %, about 0 g/mL to 1 g/mL, or about 33 v/v %.

In some embodiments, the metal salt is a zirconium-based salt. In some embodiments, the metal salt is $ZrCl_4$. In other embodiments, the metal salt can be a copper-based salt. In other embodiments, the metal reagent can be metal hydrate, metal nitrates, or combinations thereof.

In some embodiments, the linker is 2-aminoterephthalic acid ($BDC-NH_2$). In other embodiments, the linker can be terephthalic acid, benzene dicarboxylic acid derivatives, trimesic acid derivatives, or combinations thereof.

In some embodiments, the linker and the metal salt are equimolar. In some embodiments, the ratio of linker to metal salt is about 1/4:1 to 1:1/4 mol, depending on the desired MOF to be formed.

In various embodiments, the fabric includes polymer fibers. In some embodiments, the fabric can include man-made or natural fibers (e.g. spandex, polyethylene terephthalate, cotton, nyco, nylon, polyaramids, polypropylene, or other polymer blends, hemp, bamboo, canvas, burlap). Depending on the desired application, the fabric can be such as woven, spun, melt, knitted, as can be appreciated by one of ordinary skill in the art.

In various embodiments, the MOF crystals are UiO-66-$NH_2$ crystals. UiO-66-$NH_2$ crystals are formed when the linker is $BDC-NH_2$ and the metal salt is $ZrCl_4$ or other Zr-based salt.. In other embodiments, the MOF crystals are HKUST-1 or MOF-808. HKUST-1 crystals are formed when the metal reagent is a copper-based salt (e.g. copper(II) chloride dihydrate) and the linker is trimesic acid. MOF-808 crystals are formed when the metal reagent is a zirconium-based salt (e.g. $ZrCl_4$., $ZrOCl_2.8H_2O$) and the linker is trimesic acid. Advantageously, multiple MOF types can be deposited onto a fabric. For example, one MOF could be added to degrade nerve agents while a different MOF is added to degrade blistering agents, providing fabrics with protective capabilities against multiple threats.

In various embodiments, the vapor can be about 85° C. to 150° C., about 90° C. to 120° C.; or about 90° C. In some embodiments, the vapor can be a heated gas, including but not limited to air. In other embodiments, the vapor can include 0%-100% water. In some embodiments, the vapor can include acetic acid. The vapor can be a combination of water and acetic acid, where the water:acetic acid is about 1:0 to 0:1. The inclusion of acetic acid in the vapor can make the crystals larger and more crystalline than water alone. In some embodiments, the vapor can include dimethylformamide (DMF) to aid in the dissolution of the organic linker. Advantageously, the crystal size and crystallinity can be tuned depending on the composition of the vapor used. DMF also aids in formation of MOF with higher crystallinity and larger size.

In various embodiments, the MOF crystals can be about 30 nm to 10 microns, or about 30 nm to 200 nm. Smaller crystals tend to have improved toxin hydrolysis capabilities.

In various embodiments, the adsorbing of the solution onto the fabric can be via dipping, spraying, pad coating, or other methods of application that can be understood by one of ordinary skill in the art. The surface area of the MOF can be about 700 $m^2/g$ to 1500 $m^2/g$.

The methods as described above can be repeated to add additional crystals onto the fabric to increase the density of the crystals.

Advantageously, the methods described above can be adapted to make metal organic framework (MOF)-fabric composites using continuous processing. Previously, only fabric pieces could be made. Here, the MOF-fabric composites can be made with high-throughput batch processing, such as roll-to-roll. Using the methods above, the fabric can be on a first roller, and the solution can be adsorbed as the fabric passes from the first roller to a second roller. In some embodiments, the fabric can pass through a heated modulator box or a series of heated modulator boxes such that the fabric is exposed to the vapor for a time sufficient to facilitate the crystallization.

Embodiments of the present disclosure include a MOF-fabric composite as described above, wherein the fabric has crystalline MOF adhered directly to fibers of the fabric. Advantageously, there are no intermediate adhesion layers, e.g. metal oxides, between the crystalline MOF and the fabric. Surprisingly, despite having no adhesion layer, the MOF-fabric composites provided herein have high crystal adhesion. When subjected to tape tests, vigorous shaking, and handling, about 80% or more of the crystals remain adhered to the fabric.

Advantageously, the MOF-fabric composites provided herein have functional performance matching or exceeding those fabricated by more conventional, slower processes.

In embodiments, the fibers in the composite can have a BET surface area of about 10 to 800 $m^2/g_{comp}$ or about 19 to 35 $m^2/g_{comp}$. The BET surface area is is directly related to the amount of MOF in the fibers. In general, a higher value indicates better performance.

As described above, the fabric used as a substrate for the MOF-composite can be such as spandex, polyethylene terephthalate, cotton, nyco, or polypropylene.

The MOF-fabric described herein hydrolyzes and blocks permeation of the chemical warfare agent various organophosphate toxins, including methyl paraoxon (DMNP) pesticides and chemical warfare agents (CWAs) including but not limited to soman (GD) and VX. When tested against soman, the fabrics described herein outperformed protection-standard activated carbon cloth.

Also provided herein are products including the MOF-fabric composites. The products can include personal protective equipment such as military uniforms or lab protective clothing. In some embodiments, the MOF-fabric composite can be between two layers of a different fabric to provide a composite material. Advantageously, the MOF crystals can maintain their structure and efficacy when heated. In some embodiments, the MOF-fabric composite can be a melt layer that also functions to adhere two layers of fabric together while providing permeation protection. In other embodiments, products including the MOF-fabric composites can be such as air filters, odor absorbers, chemical cleanup fabrics, protective equipment for non-military applications such as civilian and law enforcement, and agricultural textiles.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Here, we report a novel mechanism for rapid UiO-66-$NH_2$ synthesis in common low boiling point solvents (water, ethanol, and acetic acid) and reveal acid-base chemistry promoting full linker dissolution and vapor-based crystallization. The mechanism enables scalable roll-to-roll production of mechanically resilient UiO-66-$NH_2$ fabrics with superior chemical protective capability. Solvent choice and segregated spray delivery of organic linker and metal salt MOF precursor solutions allows for rapid MOF nucleation on the fiber surface and decreases the energy and time needed for post-processing, producing an activated composite in less than 165 min, far outpacing conventional MOF-fabric synthesis approaches. Our MOF-fabric hydrolyzes and blocks permeation of the chemical warfare agent soman, outperforming the protection-standard activated carbon cloth. This work presents both chemical insights into Zr-MOF powder and fabric composite formation by a rapid, industrially relevant approach and demonstrates its practicality and affordability for high performing personal protective equipment.

Example 1

Polymer composites incorporating UiO-type metal organic framework (MOF) materials are proving useful for catalytic, environmental remediation, drug delivery, gas sorption, viral remediation, and other needs.[1-5] However, composite synthesis techniques reported to date are slow and environmentally unfriendly, relying, for example, on long batch reaction times, toxic solvents such as dimethyl formamide (DMF), and extended post processing steps which hinder scalability and commercial implementation.[1,6] As compiled in Table 1.1, researchers have explored nontoxic solvents including aqueous acetic acid or formic acid, but a key problem for UiO-type MOFs is that common benzenedicarboxylic acid (BDC) linkers such as BDC, BDC-$NH_2$, and BDC-Br are generally insoluble in water, and introducing zirconium salts to form the metal secondary building unit (SBU) clusters can lead to rapid metal hydrolysis, undesired heterogeneous reactions, and viscous products.[7-11] In the case of BDC-$NH_2$, a disodium 2-amino-terephthalate precursor can be formed to increase aqueous solubility.[12] Environmentally benign γ-valerolactone (GVL), cyrene, ionic liquids, and other high boiling point solvents[13,14] can help address this problem, but they also are not readily scalable because they add substantial cost and are difficult to remove from MOF pores after synthesis.[14-17] Also, compared to MOF powders, producing polymer-UiO-66-$NH_2$ composites is more complex, often requiring long reaction times, lengthy post processing steps, and highly acidic environments.[1,9,18-21] For example, we recently reported an environmentally benign sorption-vapor method for MOF-fabric composite synthesis using GVL as a green solvent, but samples were produced piece-wise, where each 2"×2" MOF-fabric piece underwent reaction for 24 h and post-process cleaning for 72 h before undergoing testing.[9] Table 1.2 lists previously reported in-situ fiber-first made UiO-66-$NH_2$ MOF-fabrics.

TABLE 1.1

Summary of green synthesis methods for UiO-66 type powder in literature.

| MOF | Primary modulators solvents/ | T [° C.] | Reaction Conditions | Time [h][a] Synthesis | Washing | Drying | Total | Ref. |
|---|---|---|---|---|---|---|---|---|
| UiO-66-$NH_2$ | $H_2O$/EtOH/ HOAc | 90 | — | 0.24-1 | 0.2 | 1.5 | 3 | This work |
| UiO-66-(OH)$_2$+ [b] | $H_2O$/HOAc | 95 | Stirring/ microwave | 1 | N/A | 24 | 25 | [1] |
| UiO-66-$NO_2$ | $H_2O$/HOAc | RT | stirring | 72 | 48 | 48 | 168 | [2] |
| UiO-66 | IL/HOac | RT | stirring | 1 | 4 | N/A | 5 | [3] |
| UiO-66 | IL/HOAc/$H_2O$ | 120 | ionothermal | 24 | 5 | N/A | 29 | [3] |
| UiO-66(COOH)$_2$ | $H_2O$/HOAc | 130 | reflux | 10 | N/A | 12 | 22 | [4] |

TABLE 1.1-continued

Summary of green synthesis methods for UiO-66 type powder in literature.

| MOF | Primary modulators solvents/ | T [° C.] | Reaction Conditions | Time [h]$^{a)}$ Synthesis | Washing | Drying | Total | Ref. |
|---|---|---|---|---|---|---|---|---|
| UiO-66-NH$_2$+ | H$_2$O/HOAc | RT | stirring | 72 | N/A | 12 | 84 | [5] |
| UiO-66-(COOH)+ | H$_2$O/HOAc | 90 | stirring | 24 | N/A | N/A | 24 | [5] |
| UiO-66-NH$_2$ | H$_2$O/HOAc | 90-150 | Continuous flow | — | 24 | 12 | 36 | [6] |
| UiO-66-NH$_2$ | H$_2$O/HOAc | 90 | Stirring | 24 | 72 | 24 | 120 | [7] |
| UiO-66 | Solvent free | 130 | Autoclave | 12 | N/A | 12 | 24 | [8] |
| UiO-66-PYDC | H$_2$O/HOAc | 100 | — | 24 | N/A | N/A | 24 | [9] |
| UiO-66-F$_4$+ | H$_2$O | — | Liquid assisted grinding | 0.25 | N/A | 24 | 24 | [10] |
| UiO-66+ | H$_2$O/formic acid | 98 | stirring | 16 | N/A | N/A | 16 | [11] |
| hcp UiO-66 | H$_2$O/Benz or formic acud/ | 100 | — | 72 | N/A | 24 | 96 | [12] |
| UiO-66-NH$_2$—F$_4$ | H$_2$O/HOAc | 100 | reflux | 24 | 144 | 24 | 192 | [13] |
| UiO-66+ | H$_2$O/HOAc or formic or TFA | 105 | reflux | 24 | 96 | 24 | 144 | [14] |
| UiO-66+ | H$_2$O/HOAc | 100/120/120/ | reflux | 24 | 144 | 24 | 192 | [15] |
| UiO-66-F$_4$ | H$_2$O/HOAc | 150 | autoclave | 24 | N/A | N/A | 24 | [16] |
| UiO-66 | IL/HOAc | RT | stirring | 0.17-1 | 48 | 24 | 73 | [17] |
| UiO-66-(COOH)$_2$+ | H$_2$O/TFA or HOAc | RT | stirring | 40-48 | 48 | N/A | 96 | [18] |
| hcp UiO-66 | H$_2$O/HOAc/IL | 100 | — | 72 | N/A | 24 | 96 | [19] |
| UiO-66-(COOH)$_2$ | H$_2$O | 100 | reflux | 24 | 16 | N/A | 40 | [20] |
| UiO-66 | H$_2$O/NaOH | RT | Dropping/stirring | 24 | N/A | N/A | 24 | [21] |
| UiO-66+ | H$_2$O/TEA | — | Milling | 0.5-1.5 | N/A | N/A | 1.5 | [22] |
| UiO-66-NH$_2$ | NaOH/H$_2$O/HOAc | RT | stirring | 1-24 | 16 | 16 | 33 | [23] |
| UiO-66-(COOH)+ | H$_2$O | 110-150 | reflux | 24 | 16 | N/A | 40 | [24] |

$^{a)}$(N/A indicates time not given)
$^{b)}$(+ indicated other UiO-66 analogs were also synthesized)

TABLE 1.2

Summary of in-situ fiber-first UiO-66-NH$_2$ fabrics in literature.

| Substrate | Benign | Primary solvent | Pretreatment | Time [h] Synthesis | Washing | Drying | Total | Ref. |
|---|---|---|---|---|---|---|---|---|
| PET | ✓ | H$_2$O/EtOH/HOAc | 0 | 1 | 0.2 | 1.5 | 2.7 | This work |
| PP | X | DMF | 2.5 | 24 | 48 | 12 | 86.5 | [25] |
| Spandex | X | DMF | 0 | 3 | 48 | 48 | 99 | [26] |
| Spandex | ✓ | GVL | 0 | 24 | 24 | 48 | 96 | [27] |
| PET | X | DMF | 15 | 24 | N/A | N/A | 39 | [28] |
| Cotton | ✓ | H$_2$O/NaOH | N/A | <1 h | <1 h | 24 | 26 | [29] |
| Graphene oxide | X | DMF | 0 | 24 | N/A | 12 | 26 | [30] |
| PET | ✓ | H$_2$O/TFA | 0 | 4 | >24 | 24 | 52 | [31] |
| Cotton | X | DMF | 2 | 20 | N/A | 12 | 34 | [32] |
| Cotton | X | DMF | 12 | 24-120 | N/A | 24 | 60 | [33] |
| PAN | ✓ | Acetone | 0-24 | 24 | 1.5 | 0.5 | 26 | [34] |
| PP | X | DMF | 8 | 24 | 48 | 24 | 104 | [35] |
| PMMA | X | DMF | 5 | 24 | 50 | 12 | 91 | [36] |

TABLE 1.2-continued

Summary of in-situ fiber-first UiO-66-NH$_2$ fabrics in literature.

| Substrate | Benign | Primary solvent | Pretreatment | Synthesis | Washing | Drying | Total | Ref. |
|---|---|---|---|---|---|---|---|---|
| Cotton | X | DMF | 96 | 24 | N/A | N/A | 120 | [37] |
| Cotton | X | DMF | 4 | 24 | 0.5 | 24 | 52.5 | [38] |
| Cotton/Polyamide | X | DMF | 0 | 1.2 | N/A | N/A | 1.2 | [39] | a)(N/A indicates time not given)

To enable more facile production of MOF-composites, several researchers have explored roll-to-roll MOF-fabric processing, but reported processes relied on toxic solvents, high processing temperatures, or were not applied to Zr-type MOFs.[22-24] Therefore, there is a need to develop more versatile, scalable processing techniques for rapid, continuous, and environmentally safe roll-to-roll MOF-fabric synthesis.[1,6]

In this work, we report a novel aqueous-based UiO-66-NH$_2$ synthesis route for rapid, high-yield production of MOF-polymer composites. As an example system, we chose UiO-66-NH$_2$-composite polyester fabrics because these MOF-fabrics have excellent performance for hydrolysis of toxic organophosphates including methyl paraoxon (DMNP) pesticides and chemical warfare agents (CWAs) including soman (GD), VX, and others.[1,9,21,25,26] This synthesis route is also amendable to other fabric types including spandex/polyester blends and polyamide. Our approach involves dissolving the linker and metal solutions in separate solvent mixtures and introducing them separately to the polymer composite substrate where they absorb into the polymer. This separated dissolution allows freedom in aqueous solvent choice and avoids undesired, premature homogeneous MOF nucleation. After reactants absorb into the polymer, the fabrics are exposed to water vapor at 120° C. allowing reactant out-diffusion and rapid heterogeneous MOF crystallization, with the resulting MOF crystals robustly integrated onto the polymer surface. The use of water, ethanol, and acetic acid, has a twofold benefit; they: (1) promote rapid crystallization; and (2) volatize rapidly so that MOF pore activation times can be reduced to less than 2 h. Further, this method, using separated reactants, environmentally benign solvents, rapid heterogeneous nucleation, and minimal post-reaction processing time, can be readily implemented for roll-to-roll MOF-fabric synthesis, yielding MOF-fabric materials with functional performance matching or exceeding those fabricated by more conventional, slower processes.

These UiO-66-NH$_2$-fabrics were evaluated for capture and solid-state hydrolysis of chemical warfare nerve agents. For these fabrics, a single layer fully degraded soman in 24 h, and three layers achieved a soman breakthrough time of 400 min exceeding the standard activated carbon (AC) cloth. The chemical insights provided by this work expand Zr-MOF fabric synthesis to industrially relevant roll-to-roll techniques therefore broadening the potential of MOF-fabric applications. Cost evaluations indicate our materials are a significant step towards next generation, affordable personal protective equipment which is important now more than ever due to heightened CWA threats.

Results and Discussion

Rapid, Green UiO-66-NH$_2$ Synthesis Mechanism

Evolution of UiO-66-NH$_2$ precursors into crystalline MOF in benign solvents was studied by characterizing the products formed when the metal salt (ZrCl$_4$) reacted with the organic linker (BDC-NH$_2$) for various times. At room temperature, the ZrCl$_4$ dissolves readily in ethanol (EtOH) producing a clear solution as shown in FIG. 1.1A. At 90° C., the BDC-NH$_2$ organic linker was sonicated in water/acetic acid (H$_2$O/HOAc), producing a bright-yellow opaque solution. Equal parts of the ZrCl$_4$ and BDC-NH$_2$ solutions were mixed, heated to 90° C., and the solution was observed as a function of time. Resulting images are given in FIG. 1.1B. After different reaction times, 100 µL of the product solution was extracted and dispersed onto a silicon wafer and dried at room temperature for SEM, XRD, FTIR, and XPS analysis. After 15, 30, or 60 minutes of reaction, the remaining solution was filtered, and the resulting powder product was collected, washed, and dried for N$_2$ isotherm measurements.

As shown in FIG. 1.1A, immediately after combining the linker and metal solutions at room temperature (0 min), the product solution was opaque and bright yellow. After 5 min at 90° C., the product solution became clear with a yellow tint, and SEM in FIG. 1.1B shows that the product was a dense solid with no defined crystals. After 15, 30, and 60 min at 90° C., the product solution returned to an opaque appearance with a pale-yellow precipitate. After 15 min, SEM shows defined crystals ~36 nm in diameter (measured by ImageJ). After 30 min, the crystals grew to ~57 nm and retained their size and shape after 60 min. Consistent with SEM images, XRD spectra show the 0 and 5 min products were mostly amorphous with a slight broad peak between 6-10° (FIG. 1.1C). After 15 min, prominent peaks appeared at 7.3, 8.5, and 12.1° consistent with UiO-66-NH$_2$ crystals, and the peaks became more intense after 30 min consistent with larger crystal size. XRD intensity also increased from 30 to 60 min indicating rearrangement into a more ordered form while maintaining crystal size. The N$_2$ isotherms of the precipitated products at 15, 30, and 60 min (FIG. 1.1D) showed a BET SA of 950; 1,000; and 800 m$^2$ g$^{-1}$, respectively, further verifying the formation of porous UiO-66-NH$_2$. The products after 15, 30, and 60 min also showed large N$_2$ uptake at high relative pressure, consistent with microscale spacing between the nanoscale crystals.[9]

FIG. 1.1E shows FTIR spectra of the products demonstrating how the chemical reaction evolved with time. The peaks at 424 and 480 cm−1 corresponding to µ3-OH stretching increased in intensity up to 60 min, consistent with the formation of Zr clusters.[20] The initial spectrum (0 min) shows the Zr—O stretching mode at 659 cm−1, and —OCO— asymmetric and symmetric stretching modes at 1417 and 1584 cm−1. After 60 min, the Zr—O peak shifted to 670 cm−1 and the —OCO— modes shifted to 1423 and 1596 cm-1, respectively. These shifts are consistent with —OH groups replacing the more electronegative Cl— groups at the Zr node, and the expected —OCO— linker group deprotonation and incorporation into the MOF structure.[27,28]

To further characterize chemical composition, we performed XPS on the 5 and 30 min products, and results are given in FIG. 1.1F. Both samples show similar Zr 3d spectra with peaks associated with Zr—O clusters.[29,30] The N 1s peaks near 401.8 and 399.5 eV correspond to —$NH^{3+}$ (protonated amine group) and —NH2, respectively,[31] and peaks in the O 1 s spectra at 534.0, 531.8, and 530.3 eV correspond to —COOH, Zr—O—C, and Zr—O respectively. Between 5 and 30 min, the protonated amine peak becomes substantially diminished and the Zr—O—C peak becomes more dominant, consistent with deprotonation of the BDC-$NH^{3+}$ linker and formation of UiO-66-$NH_2$ precipitate.[32,33]

From the data in FIGS. 1.1A-1.1F, we hypothesize that the reaction between the MOF precursors follows the mechanism shown in FIG. 1.1G. First, $ZrCl_4$ hydrolyzes to form a Zr-oxo complex releasing hydrochloric acid (HCl); the liberated HCl then protonates the BDC-$NH_2$ to form BDC-$NH^{3+}Cl^-$ salt which is soluble in the aqueous phase. Upon dissolution in the aqueous phase, the organic and metallic species react and stabilize as an insoluble UiO-66-$NH_2$ crystalline precipitate. The zirconium cluster formation and carboxylic deprotonation is consistent with the observed shift in the O—C—O related peak in the FTIR data as well as the peak at ~401.8 eV in the XPS N1s peak associated with the protonated amine on the linker. As the reaction proceeds, the UiO-66-$NH_2$ precipitate particles continue to grow and rearrange into a more crystalline product, as observed in SEM and XRD.

To test this proposed mechanism, we dissolved BDC and BDC-$NH_2$ in heated HCl solutions. Based on the mechanism, the BDC-$NH_2$ is expected to dissolve readily, whereas the BDC without the amine ligand will show limited dissolution. As shown in FIG. 1.1H, adding BDC-$NH_2$ to a mixture of $H_2O$/HOAc/EtOH/HCl at 90° C. led to a fully dissolved, clear solution, whereas the same concentration of BDC produced a poorly dissolved, opaque solution consistent with our hypothesis. This difference is understood by considering that in the aqueous HCl solution, the BDC-$NH_2$ readily forms an intermediate soluble BDC-$NH^{3+}+Cl^-$ salt whereas the BDC (without the $NH_2$ group) remains insoluble. Completing the UiO-66 synthesis using BDC solution led to few MOF crystals and substantial unreacted precursor as shown by XRD in FIG. 1.1I. These results indicate that for UiO-66-$NH_2$, once the linker and metal solutions are mixed and heated, the linker dissolves into the aqueous phase through acid-base interaction. The facile reactant mixing in the aqueous phase then enables rapid reaction to form highly crystalline MOF.

Benign, Rapid MOF-Fabric Production

Following the mechanism in FIG. 1.1G, we hypothesized that UiO-66-$NH_2$ MOF-polymer composites could be formed rapidly by delivering the source reactants in separate solutions via spraying onto a polymer fabric substrate, followed by exposure to heated water vapor for heterogeneous MOF growth.[9,34] We refer to this approach as "source separated sorption-vapor synthesis" (SS-SVS). Also, because the use of low boiling point solvents allows rapid precursor consumption to create nano-scale MOF crystals, we further hypothesize that the solvent exchange step can be eliminated, thereby allowing much faster production of ready-to-use MOF-fabrics.

To test the SS-SVS method, metal EtOH/$ZrCl_4$ (room temperature) and linker $H_2O$/HOAc/BDC-$NH_2$ (90° C.) solutions were prepared and maintained in separate vials, as shown schematically in FIG. 1.2A. Then (Step 1) a 5 cm×5 cm (2 in×2 in) polyethylene terephthalate (PET) fabric swatch was simultaneously sprayed with linker and metal solutions. This spraying step proceeded for ~2 min, during which ~2.6 ml of each solution was delivered approximately uniformly across the fabric sample. Fabric swatches were immediately moved to Step 2 without washing. Next, (Step 2) the fabric was suspended in a media vial over room temperature water, then transferred to an open-air oven pre-heated to 90 or 120° C., allowing the vapor to interact with the soaked fabric for times ranging from 0.5-3 h. The solvent vapor assists precursor mobility and promotes MOF crystal formation.[34-36] Finally, (Step 3) the resulting PET@UiO-66-$NH_2$ MOF-fabric was allowed to cool for ~10 min at room temperature, then removed from the vial and washed and dried using a conventional procedure consisting of soaking in EtOH for 18-24 h, drying in air at 75° C. for 18-24 h, and drying under vacuum at 85° C. for 18-24 h. The total time for this post-processing step (Step 3), referred to here as the "slow-wash" method, ranged from 54-72 hours.

For the different water vapor exposure temperatures and times in Step 2, the amount of MOF integrated onto the fabric was analyzed by mass, and the results are shown in Table 1.4 and FIG. 1.2E. The different exposure times and temperatures led to similar mass loading, whereas increasing vapor exposure time or temperature led to an increase in MOF crystallinity, as indicated by the XRD results in FIG. 1.2G. This increased crystallinity is consistent with results from UiO-66-$NH_2$ powder synthesis shown in FIGS. 1.1A-1.1G.

TABLE 1.4

Table of select properties of slow-made PET@UiO-66-$NH_2$ made with various vapor exposure times and temperatures.

| Vapor exposure time [h] | Vapor exposure temp [° C.] | MOF mass leading [%] | BET SA [$m^2 g_{comp}^{-1}$] | Porous MOF loading [%] | DMNP $t_{1/2}$ [min] | TOF [min] |
|---|---|---|---|---|---|---|
| 0.5 | 90 | 16 | 109 | 10 | — | — |
| 1 | 90 | 16 | 119 | 11 | 35 | 0.1 |
| 3 | 90 | 17 | 113 | 10 | 19 | 0.2 |
| 0.5 | 120 | 19 | 98 | 8 | 40 | 0.4 |
| 1 | 120 | 16 ± 1 | 123 ± 14 | 15 ± 2 | 18 ±4 | 0.34 ± 0.05 |

The resulting PET@UiO-66-$NH_2$ MOF-fabric was also tested for its ability to hydrolyze pesticide DMNP in an aqueous buffered solution. DMNP experiments were performed using N-ethylmorpholine (NEM) as a basic co-catalyst. Consistent with increased MOF crystallinity, fabrics produced using longer vapor exposure times and higher temperatures showed more rapid catalytic DMNP hydrolysis. For further SS-SVS MOF-fabric syntheses described below, we fixed the water vapor exposure conditions at 1 h and 120° C. which produced materials with fast DMNP hydrolysis kinetics ($t_{1/2} \approx 23$ min).

Comparing Conventional and Rapid Post Processing Methods of MOF-Fabrics

In MOF-fabric syntheses, the "slow-wash" post-process step described above is routinely used to ensure: 1) the commonly used high boiling point solvents such as DMF are sufficiently exchanged with low boiling point solvents such as EtOH; 2) any unreacted precursor and loose MOF powder are removed; and 3) the functional sites within the MOF crystal are fully activated for the desired application. Even with extensive washing and drying, high boiling point solvents such as DMF and GVL are known to remain in the MOF pores.[9]

As mentioned above, we hypothesize the SS-SVS method can eliminate the need for solvent exchange, thereby reducing the time and energy required to activate the MOF. To test this hypothesis, we developed a new "fast-wash" post-process step for MOF-fabric composites and compared the resulting composites to those produced with the "slow-wash" procedure. The fast-wash process consisted of two 5 min EtOH soaking steps and a 60 min drying step at 75° C., followed by a 30 min drying step at 85° C. under vacuum. For the 5 cm×5 cm sample used here, the fast-wash method allowed MOF-fabric to be fabricated to completion (i.e. ready for immediate use) in less than 165 min, which is 20× faster than the ~ 55 h needed to produce a similar MOF-fabric material following the conventional, slow-made process, and nearly ~10× faster than previously reported in-situ fiber-first UiO-66-NH$_2$ fabrics (Table 1.2).[1]

The slow-made and rapid-made MOF-fabrics were analyzed by mechanical robustness testing, weight change, SEM, XRD, N$_2$ adsorption, and organophosphate pesticide DMNP hydrolysis, and results are given in FIG. 1.2B-1.2D and Table 1.4. In both the slow-wash and fast-wash methods, the EtOH used to wash the MOF-fabric after synthesis remained clear as shown in FIG. 1.3 indicating minimal presence of unreacted precursor. The robustness of rapid-made PET@UiO-66-NH$_2$ was tested by laboratory handling, a tape test, and an abrasion test, respectively. As shown in the video, after common lab handling, no MOF material was visible on the nitrile gloves. Likewise, the tape test showed negligible MOF removal from the fabric. The abrasion test involved vigorously shaking the MOF-fabric for 1 min in the presence of metal balls, after which the fabric sample showed a small amount of mass loss. Mass measurements indicated that 82% of the original MOF remained on the fabric illustrating good mechanical resiliency. As shown in the SEM images in FIG. 2.2B, following the rapid-PET@UiO-66-NH$_2$ synthesis, the smooth starting PET fibers become covered with a dense, creviced crystal coating, and high magnification images reveal the coating is composed of nano-scale crystals similar to the slow-made materials.

TABLE 1.4

Select properties of slow-made and rapid-made PET@UiO-66-NH$_2$ The uncertainty is the standard deviation for three MOF-fabrics samples produced independently using identical conditions.

| Synthesis | MOF loading [wt %] | BET SA [m$^2$g$_{comp}^{-1}$] | Porous MOF loading [wt %] | DMNP $t_{1/2}$ [min] | DMNP TOF$_{11/2}$ [min$^{-1}$] |
|---|---|---|---|---|---|
| Slow-made | 16 ± 1 | 123 ± 14 | 15 ± 2 | 23 ± 12 | 0.3 ± 0.1 |
| Rapid-made | 17 ± 1 | 117 ± 15 | 14 ± 2 | 18 ± 4 | 0.3 ± 0.1 |

From the data in FIG. 1.2A-1.2D and Table 1.4, using the same starting materials, the MOF-fabrics produced via the rapid-made and slow-made methods show similar MOF loading, N$_2$ isotherms, BET SA, and XRD patterns. The rapid-made and slow-made fabrics also showed similar fast DMNP hydrolysis kinetics. The high performance of the rapid-made composites confirms our hypothesis that MOF-fabrics can be made using high throughput SS-SVS batch synthesis while maintaining material properties and performance.

Spandex/polyester, cotton, polyamide, and polypropylene were also explored as substrates for rapid UiO-66-NH$_2$ SS-SVS, and the experimental conditions and visual, weight, and surface area results are presented in FIG. 1.4 and Table 1.5. PET had the highest MOF loading and BET SA of the fabrics studied. We expect backbone chemistry and other factors such as fiber packing, fiber diameter, and fabric properties (i.e. woven vs nonwoven) can impact the MOF crystallization during SS-SVS. Further, based on previous sorption-vapor synthesis work, we expect that MOF loading can be adjusted by either repeating SS-SVS on the same fabric swatch or by adjusting the precursor concentration.[9,34]

Table 1.5 shows select properties of rapid-made fabric@UiO-66-NH$_2$

| Fabric | MOF loading [wt %] | BET SA [m$^2$g$_{comp}^{-1}$] | MOF BET loading [wt %] |
|---|---|---|---|
| PP | 15 | 22 | 2 |
| PA-6 | 10 | 55 | 6 |
| Nyco | 1 | 12 | 1 |
| Spandex | 5 | 43 | 5 |
| PET | 17 | 130 | 12 |

To test if the rapid-made PET@UiO-66-NH$_2$ fabrics can be re-activated for DMNP hydrolysis, the same 14 mg MOF-fabric swatch was used for two sequential DMNP hydrolysis experiments. As shown in FIG. 1.5, the second experiment showed DMNP hydrolysis, but the rate was reduced compared to the first test. We also find that the rigorous stirring during the first 90 min hydrolysis step led to loss of MOF from the fabric, and the slower DMNP hydrolysis is consistent with the smaller MOF loading.

The XRD of PET@UiO-66-NH$_2$ after DMNP hydrolysis was also collected. As shown in FIG. 1.6, the UiO-66-NH$_2$ crystallinity is maintained. The loss in peak intensity is consistent with the decrease in mass measured after the DMNP hydrolysis experiments.

To demonstrate feasibility of process scaling, we evaluated the SS-SVS method in a roll-to-roll configuration, as shown in FIG. 1.7. The test configuration consists of a 15 cm wide nonwoven PET fabric rolled onto a feed spool, enabling fabric transport into a ~20 cm long spray zone. Within the spray zone, 40 mL precursor solution is applied, and the fabric is then immediately rolled into the heated crystallization zone (~100° C.) where it is exposed to water vapor under static (stationary) conditions for 1 h. The MOF-fabric is then rolled out of the crystallization zone and collected onto the final product roll. The sequence corresponded to a linear production rate of ~0.2 m h−1. For the fabric width of 15 cm used here, the linear rate corresponds to an areal rate of 0.03 $m^2$ h−1. For analysis, a MOF-fabric piece was cut from the fabric roll, washed in EtOH 10 min, and dried 24 h at 75° C. followed by 1 h at 85° C. under vacuum. Full details are given in Experimental. The roll-to-roll made PET@UiO-66-$NH_2$ (referred to as R2R PET@UiO-66-$NH_2$) was analyzed for MOF adhesion and by SEM, $N_2$isotherm, XRD, and DMNP hydrolysis. Measurements taken in triplicate were from three 5 cm×5 cm squares cut from the center of the roll, evenly distributed along the length.

The UiO-66-$NH_2$ remained adhered to the R2R PET substrate during regular laboratory handling. A tape test revealed no MOF detachment from the fabric similar to the rapid-made PET@UiO-66-$NH_2$. Exfoliation could be forced by abrupt mechanical disturbances such as tearing. Generally, protective garments utilize multi-layer fabrics, where the reactive layer (i.e. MOF-fabric) is encased between two protective layers, thereby helping to avoid abrasion, tearing, sweat and other environmental concerns.[37] SEM images, XRD, and $N_2$ isotherm data (FIG. 1.8A-1.8C) confirm the formation of porous UiO-66-$NH_2$ crystals on the PET surface and a composite BET SA of 250±75 $m^2$ $g_{comp}^{-1}$. Roll-to-roll PET@UiO-66-$NH_2$ hydrolyzed DMNP with a $t_{1/2}$ of 13±5 min shown in FIG. 1.4, consistent with previous results. The MOF-fabric made using the roll-to-roll system had a higher BET SA and slightly improved DMNP kinetics than the batch made PET@UiO-66-$NH_2$, possibly due to the volume of precursor solution used: ~0.26 mL $cm^{-2}$ roll-to-roll vs. ~0.20 mL $cm^{-2}$ batch. These results represent pioneering work in scaled production of Zr-MOF fabrics using roll-to-roll production. We calculated the materials cost needed to produce 15 cm wide PET@UiO-66-$NH_2$ using our lab scale roll-to-roll set up. Without optimization, the estimated material cost of our MOF-fabrics is $50 per linear meter (LM) which is less than the approximate price of activated carbon cloth by online suppliers ~$80 LM-1. This estimated cost was based only on the raw materials used to produce PET@UiO-66-$NH_2$ and does not include indirect costs associated with manpower, facilities, and overhead.

MOF-Fabric as a Chemical Warfare Agent Barrier: Soman Solid-State Hydrolysis and Permeation Our batch rapid-made and roll-to-roll made PET@UiO-66-$NH_2$ fabrics were tested for soman (GD) hydrolysis and permeation and were compared to the starting fabric and the standard carbon cloth. The standard carbon cloth was provided by the U.S. Army Combat Capabilities Development Command Chemical Biological Center and has a density of 172 g $m^{-2}$ and BET SA of 630 $m^2$ $g^{-1}$. Solid-state hydrolysis experiments consisted of exposing live agent soman to the MOF-fabric without any solution or buffer present. Conversion of GD as a function of time is shown in FIG. 1.9A. Dashed lines FIG. 1.9A represents pseudo first-order kinetics and error bars represent a predicted ±3% variation when the experiment is repeated with a duplicate sample. Rapid-made and roll-to-roll made PET@UiO-66-$NH_2$ fully degraded the GD in 24 h, outperforming untreated PET and carbon cloth which showed limited reactivity in 24 h. Permeation of GD through roll-to-roll made PET@UiO-66-$NH_2$, PET, and carbon cloth is shown in FIG. 1.9B. The weight of PET and PET@UiO-66-$NH_2$ was increased by stacking 5 cm×5 cm swatches to form 1, 2, or 3 layers of fabrics. One layer of PET, PET@UiO-66-$NH_2$, and carbon cloth weigh approximately 79, 110, and 172 gsm, respectively. Breakthrough was instantaneous with 3 layers of untreated PET. PET@UiO-66-$NH_2$ significantly outperformed the untreated PET, and the breakthrough time increased with increasing layers (gsm) of PET@UiO-66-$NH_2$. Three layers of PET@UiO-66-$NH_2$ performed better as a barrier to GD than carbon cloth. PET@UiO-66-$NH_2$ performed similarly or better than previous reports of solid-state hydrolysis of soman using UiO-66-$NH_2$ fabrics when comparing time to full GD conversion.[9,34,38,39] A more detailed comparison of effects of different MOF loadings, crystal size, fabric properties, and others would be helpful to further understand the detailed mechanisms and criteria for GD degradation upon exposure to MOF-fabrics. With both degradation and barrier capabilities, our MOF-fabrics outperform the long-standing standard for organophosphate protection.

Conclusion

Described is UiO-66-$NH_2$ synthesis in benign solvents and presented a mechanism for linker dissolution and rapid MOF formation. By separating the linker and metal in co-compatible solutions, we avoided premature side reactions and promoted heterogeneous MOF nucleation in both batch and roll-to-roll synthesis of UiO-66-$NH_2$-fabric composites. The benign solvent choice allowed rapid post processing ("fast-wash") of the MOF-fabric without sacrificing material properties compared to more conventional methods ("slow-wash"). PET@UiO-66-$NH_2$ composites showed full conversion of GD in 24 h under solid-state conditions and performed as an effective barrier for GD permeation. The approaches and chemical insights provided by this work expand Zr-MOF-fabric synthesis approaches to industrially relevant techniques and have wide impact due to the multitude of applications currently being explored for MOF-fabrics. This simple, scalable MOF-fabric synthesis method provides a significant step towards the goal of next generation, feature enhanced, affordable personal protective equipment.

Experimental Section/Methods

Materials: Solvents included deionized water ($H_2O$, in-house), ethanol (EtOH, 200 proof Koptec), and glacial acetic acid (HOAc, >99.7% Northwest Scientific Inc.). Zirconium (IV)chloride ($ZrCl_4$, 99.5% Alfa Aesar) and 2-aminoterephthalic acid (BDC-NH2, 99% Aldrich) were used as UiO-66-$NH_2$ precursors. All solvents and precursors were used without further purification. Fabrics used include nonwoven polyethylene terephthalate (PET), polypropylene (PP) and nylon (PA-6) (The Nonwovens Institute), 50/50 nylon/cotton (nyco) (U.S. Army Natick Soldier Systems Center), and spandex(8%)/polyester (spandex) (commercial garment). All fabrics were used as received without further treatment.

UiO-66-$NH_2$ powder synthesis. 0.13 M BDC-$NH_2$ was dispersed in equal parts $H_2O$/HOAc via sonication in a media vial and heated to 90° C. In a separate vial, 0.14 M $ZrCl_4$ was dissolved in EtOH by stirring at room temperature. While stirring separately, 2 mL of the metal solution followed by 2 mL heated linker solution were added to a new vial, stirred ~30 sec, and the vial was placed in a preheated oven at 90° C. The vial was removed from the oven at a designated time point, the product was stirred ~5 sec, then 100 μL of the product solution was placed on an IR transparent silicon (Si) wafer and dried at room temperature. After visual inspection, the remaining product solution was quenched with room temperature EtOH. The product was then separated by filtration, washed in fresh EtOH 10 min, re-filtered, dried 30 min at 120° C., and, finally, dried 60 min at 85° C. under vacuum.

SS SVS of fabric@UiO-66-NH$_2$. First, approximately 2.6 mL of 0.13 M BDC-NH$_2$ solution and 2.6 mL of 0.14 M ZrCl$_4$ solution, previously described in powder experimental section, were sprayed simultaneously onto a 2 in ×2 in fabric swatch. Next, the fabric was suspended in a media vial containing room temperature water, and the vial was immediately transferred to a 90 or 120° C. preheated oven. After heating for 0.5-3 h, the vial was removed from the oven and cooled for 10 min at room temperature. The fabric was then removed from the vial, washed in EtOH, and dried using either a slow or rapid method. The more conventional, slow method consisted of a short 5 min soak in EtOH immediately followed by a slow 18-24 h soak in fresh EtOH, followed by drying in air at 75° C. for 18-24 h and drying under vacuum at 85° C. for 18-24 h. The resulting samples are referred to here as "slow-made" MOF-fabric. The rapid method consisted of soaking the MOF-fabric in EtOH for 5 min, transferring to a second soak in fresh EtOH for another 5 min, then drying in air at 75° C. for 30 min, followed by drying under vacuum at 85° C. for 1 h. These samples are referenced as "rapid-made" MOF-fabric.

Roll-to-roll PET@UiO-66-NH$_2$ synthesis. Roll-to-roll PET@UiO-66-NH$_2$ production was conducted on a home-built roll-to-roll line. A long, 6" (15 cm) wide PET fabric piece was suspended between two rollers with excess PET on the starting roll. First, 40 mL 0.13 M BDC-NH$_2$ in equal parts H$_2$O/HOAc was sonicated for ~20 min or until use. 40 mL 0.14 M ZrCl$_4$ in EtOH was prepared and stirred until use. The linker and metal solutions were combined into a single spray bottle and immediately sprayed onto ~8" (20 cm) of the PET roll. The sprayed section of fabric was then immediately rolled into a heat/vapor zone (90-110° C.) where it remained for 1 h. When the 1 h was complete, the next section of fabric was sprayed with precursor solution and rolled into the heat/vapor zone as the previous section was rolled from the heat/vapor zone onto the final MOF-fabric roll. After several iterations, the MOF-fabric was cut from the starting roll, washed in EtOH for 5 min, removed and washed in fresh EtOH an additional 5 min, dried at 75° C. 18-24 h, and dried at 85° C. under vacuum 1 h.

MOF-fabric robustness tests. Tape tests were performed by placing scotch tape on the MOF-fabric. The tape was then quickly removed and visually inspected for MOF powder contaminates. We also performed an abrasion test which consisted of vigorously shaking the MOF-fabric in a 100 mL media vial with 120 g of metal balls for 1 min. The fabric was weighed before and after the abrasion test to determine mass loss.

Methyl paraoxon hydrolysis. Methyl paraoxon (DMNP) hydrolysis tests were performed as previously described.[9] 14 mg untreated fabric or MOF-fabric, 1 mL 0.45 M aqueous N-ethylmorpholine (NEM, Fluka), and a stir bar were placed in a Eppendorf tube, weighed, then stirred at ~1100 RPM for 15 min. 4 µL DMNP (Pestanal) was then added to the Eppendorf tube wall without touching the NEM solution or MOF-fabric and the tube was weighed to obtain the weight of DMNP. The tube was then shaken for several seconds to incorporate the DMNP into the solution. The mixture was then continuously stirred. At designated time points, 20 µL aliquots of the reaction solution were diluted in 10 mL 0.15 M aqueous NEM solution. Ultraviolet-visible (UV-vis) spectroscopy (Thermo Scientific 300) was used to track formation of the product p-nitrophenoxide at ~407 nm. DMNP half-life ($t_{1/2}$) and turnover frequency at half-life were (TOFt$_{1/2}$) were calculated as previously detailed.[9]

Soman solid-state hydrolysis. MOF-fabrics were tested using dose extraction techniques to the solid substrate. Untreated fabric or MOF-fabric (10-40 mg) was first placed in a small vial to minimize vapor loss. Vials were then placed in a preheated oven and dried at 60° C. for 1 h followed by exposure to 50% relative humidity overnight. Soman was then pipetted directly onto the fiber surface and the vial vortexed to ensure maximum contact. After a set time, vials were cooled with dry ice for 10 min and 1-2 mL acetonitrile was used to extract reactants and products from the fabric. Extraction solvent was passed through a 0.45 µm nylon membrane syringe filter, and the amount of soman remaining was determined by GC/MS (Agilent 6890/5973). Warning! Soman is an extremely toxic chemical warfare agent and should only be handled by authorized personnel.

Soman permeation. Soman permeation was conducted in accordance with ASTM F739-12 as previously reported.[9] Fabric was first loaded into a 1 in diameter Pesce PTC 700 permeation test cell. Two air streams, one above the sample and once below, were maintained at a flow rate of 300 mL min−1 and 0% relative humidity. A constant 0.2 in of H$_2$O pressure differential was maintained across the samples. The feed stream contained 300 mg m−1 of GD, and GD concentration was monitored at three locations within the permeation cell including the inlet, outlet, and opposite side of the permeation cell. Concentration was measured by a gas chromatograph with a flame ionizatoin detector. Warning! Soman is an extremely toxic chemical warfare agent and should only be handled by authorized personnel.

Characterization. MOF mass loading (mass of MOF divided by mass of composite) was determined by weighing the fabrics before synthesis and after washing and drying was complete. SEM images were collected using an FEI Verios 460L field-emission scanning electron microscope. Samples were sputter coated with ~14 nm Au/Pd prior to imaging. XRD patterns were collected using a Rigaku SmartLab X-ray diffractometer under Bragg-Brentano alignment and a Cu Kα source. A Micrometrics 3Flex Physisorption was used to collect N$_2$isotherm data. Samples were prepared for N$_2$isotherm analysis by holding at 100° C. under vacuum overnight using a Micrometrics Smart Vac Prep system. FTIR spectra were collected using a Nicolet 6700 FTIR. IR Si was used as the substrate and background for FTIR measurements. XPS data was collected using Kratoc Analytical Axis Ultra with an Al Kα gun operating at 15 kV and 10 mA.

Additional Methods:

(See FIGS. 1.2E-1.2G). Slow-made PET@UiO-66-NH$_2$ was synthesized by SS-SVS at 90° C. with a vapor exposure time (Step 2) of 0.5, 1, or 3 h, and the resulting composites were analyzed and compared as shown in FIGS. 1.2E-1.2G. MOF loading was between 16-17 wt % for all vapor exposure times studied. As shown in FIG. 1.2E, compared to the white starting PET fabric, all MOF-fabric samples appear yellow consistent with UiO-66-NH$_2$ on the fabric surface. XRD patterns indicate that the relative crystallinity of the MOF coating increases with vapor exposure time. N$_2$ isotherms were comparable for all vapor exposure times studied and resulted in BET SA and porous MOF loading between 109-120 m$^2$ g$_{comp}^{-1}$ and 10-11 wt %, respectively. DMNP t$_{1/2}$ significantly improved with increase in vapor exposure time. Uncoated PET had minimal reactivity towards DMNP in 90 min. Based on the data in FIGS. 1.2E-1.2G, we hypothesize that the reactants are fully consumed within the first 30 minutes of the heating process to create a crystalline product. Continued heating leads to more extensive crystallization, producing larger crystal diffractions observed by XRD. Interestingly, the less crystallized materials formed after the first 30 min show porosity and surface area similar to more crystalline material formed after 3 h of heating. This suggests that after 30 min, the MOF material consists of either ultra-small crystals that are less visible by XRD, or the MOF forms initially in a porous, amorphous structure. Results also indicate that an increase in crystallinity leads to improved DMNP hydrolysis kinetics.

Vapor exposure temperature was set at 90 or 120° C. with an exposure time of 1 h for SS SVS of PET@UiO-66-NH$_2$, and composites are compared in FIGS. 1.2E-1.2G. MOF-fabrics were visually similar, and MOF loading was consistent for the temperatures studied. UiO-66-NH$_2$ XRD peak intensity significantly increased with vapor exposure temperature. Resulting N2 isotherms composite BET SAs, and porous MOF loadings were consistent between the two temperatures studied. DMNP $t_{1/2}$ was significantly enhanced from 35 to 13 min with increase in reaction temperature from 90 to 120° C., respectively. Based on the temperature dependent results, we hypothesize that the crystallization speed is proportional to vapor exposure temperature. Increased vapor exposure temperature leads to a product with larger crystal diffractions as observed by XRD. Observations also further support the hypothesis that DMNP hydrolysis rates increase with increase in MOF coating crystallinity.

(See FIG. 1.4) Rapid SS-SVS with 1 h and 120° C. vapor exposure time and temperature was used to form UiO-66-NH$_2$ coated nonwoven polypropylene (PP) and nylon (PA-6) as well as woven 50/50 nylon/coton (nyco) and 8/92 spandex/polyester (spandex) fabrics. All fabrics had significant color change after MOF growth shown in FIG. 1.4. The data shows that MOF loading and BET SA depend heavily on fabric type. The PP had the largest loading at 15 wt %, and nyco had the smallest at 1 wt %. Interestingly, PA-6 had 10× higher loading than nyco even though nyco is composed of 50% nylon. The MOF loading calculated by mass was larger than the porous MOF loading for each fabric and greatly depended on fabric type.

FIG. 1.5 shows the results from two rounds of DMNP hydrolysis completed using the same rapid-made PET@UiO-66-NH$_2$ sample. DMNP hydrolysis was run in the same manner as listed in the Experimental using 14 mg MOF-fabric. After reacting with the DMNP for 90 min (round 1), the fabric was removed from the solution, washed in H$_2$O for 12 min (replacing the H$_2$O 3 times), washed in EtOH for 10 min (replacing 2 EtOH time), and dried for 24 h at 75° C. followed by 30 min at 85° C. under vacuum to re-activate the MOF. The same piece of MOF-fabric was then used for other DMNP hydrolysis experiment (round 2). We find that the half-life significantly increased from 18 to 225 min. The turn-over frequency at 20% DMNP conversion for the first and second DMNP experiment were 0.4 and 0.2 min$^{-1}$, respectively. The MOF fabric can be reset and reused. However, there is decrease in performance that is likely attributed to MOF loss during the experiment due to vigorous, maintained stirring.

EXAMPLE 1 REFERENCES

[1] G. W. Peterson, D. T. Lee, H. F. Barton, T. H. Epps III, G. N. Parsons, *Nat. Rev.* Mater. 2021, 6, 605-621.
[2] A. Dhakshinamoorthy, A. Santiago-Portillo, A. M. Asiri, H. Garcia, *Chem Cat Chem* 2019, 11, 899-923.
[3] H. Liu, M. Cheng, Y. Liu, G. Zhang, L. Li, L. Du, B. Li, S. Xiao, G. Wang, X. Yang, Coord. *Chem. Rev.* 2022, 458, 214428-214461.
[4] M. Woellner, S. Hausdorf, N. Klein, P. Mueller, M. W. Smith, S. Kaskel, *Adv. Mater.* 2018, 30, 1704679.
[5] Y. Liu, Y. Ban, W. Yang, *Adv. Mater.* 2017, 29, 1606949.
[6] K. Ma, K. B. Idrees, F. A. Son, R. Maldonado, M. C. Wasson, X. Zhang, X. Wang, E. Shehayeb, A. Merhi, B. R. Kaafarani, T. Islamoglu, J. H. Xin, O. K. Farha, *Chem. Mater.* 2020, 32, 7120-7140.
[7] Z. Hu, A. Gami, Y. Wang, D. Zhao, *Adv. Sustain. Syst.* 2017, 1, 1700092-1700104.
[8] M. N. Nimbalkar, B. R. Bhat, *Mater. Today* Proc. 2019, 9, 522-527.
[9] S. E. Morgan, M. L. Willis, G. W. Peterson, J. J. Mahle, G. N. Parsons, *ACS Sustain. Chem. Eng.* 2022, 10, 2699-2707.
[10] H. Reinsch, B. Bueken, F. Vermoortele, I. Stassen, A. Lieb, K. Lillerud, D. De Vos, *Cryst Eng Comm* 2015, 17, 4070-4074.
[11] F. Ragon, B. Campo, Q. Yang, C. Martineau, A. D. Wiersum, A. Lago, V. Guillerm, C. Hemsley, J. F. Eubank, M. Vishnuvarthan, F. Taulelle, P. Horcajada, A. Vimont, P. L. Llewellyn, M. Daturi, S. Devautour-Vinot, G. Maurin, C. Serre, T. Devic, G. Clet, *J. Mater. Chem.* A 2015, 3, 3294-3309.
[12] I. Pakamore, J. Rousseau, C. Rousseau, E. Monflier, P. Á. Szilegyi, *Green Chem.* 2018, 20, 5292-5298.
[13] S. Kumar, S. Jain, M. Nehra, N. Dilbaghi, G. Marrazza, K.-H. Kim, *Coord. Chem. Rev.* 2020, 420, 213407-213434.
[14] J. Zhang, G. B. White, M. D. Ryan, A. J. Hunt, M. J. Katz, *ACS Sustain. Chem. Eng.* 2016, 4, 7186-7192.
[15] Y. Huang, W. Lo, Y. Kuo, W. Chen, C. Lin, F. Shieh, *Chem Comm* 2017, 53, 5818-5821.
[16] X. Sang, J. Zhang, J. Xiang, J. Cui, L. Zheng, J. Zhang, Z. Wu, Z. Li, G. Mo, Y. Xu, J. Song, C. Liu, X. Tan, T. Luo, B. Zhang, B. Han, *Nat. Commun.* 2017, 8, 175.
[17] D. M. Venturi, F. Campana, F. Marmottini, F. Costantino, L. Vaccaro, *ACS Sustain. Chem. Eng.* 2020, 8, 17154-17164.
[18] A. X. Lu, A. M. Ploskonka, T. M. Tovar, G. W. Peterson, J. B. Decoste, *Ind. Eng. Chem. Res.* 2017, 56, 14502-14506.
[19] Y.-J. J. Y. Chen, Y.-J. J. Y. Chen, C. Miao, Y.-R. R. Wang, G.-K. K. Gao, R.-X. X. Yang, H.-J. J. Zhu, J.-H. H. Wang, S.-L. L. Li, Y.-Q. Q. Lan, *J. Mater. Chem.* A 2020, 8, 14644-14652.
[20] L. Huelsenbeck, H. Luo, P. Verma, J. Dane, R. Ho, E. Beyer, H. Hall, G. M. Geise, G. Giri, *Cryst. Growth Des.* 2020, 20, 6787-6795.
[21] K. Ma, T. Islamoglu, Z. Chen, P. Li, M. C. Wasson, Y. Chen, Y. Wang, G. W. Peterson, J. H. Xin, O. K. Farha, *J. Am. Chem. Soc.* 2019, 141, 15626-15633.
[22] H. Wang, S. Zhao, Y. Liu, R. Yao, X. Wang, Y. Cao, D. Ma, M. Zou, A. Cao, X. Feng, B. Wang, *Nat. Commun.* 2019, 10, 4204.
[23] Y. Chen, S. Li, X. Pei, J. Zhou, X. Feng, S. Zhang, Y. Cheng, H. Li, R. Han, B. Wang, *Angew. Chemie—Int. Ed.* 2016, 55, 3419-3423.
[24] Y. Chen, S. Zhang, S. Cao, S. Li, F. Chen, S. Yuan, C. Xu, J. Zhou, X. Feng, X. Ma, B. Wang, *Adv. Mater.* 2017, 29, 1606221.
[25] M. C. De Koning, M. Van Grol, T. Breijaert, *Inorg. Chem.* 2017, 56, 11804-11809.

[26] N. Couzon, J. Dhainaut, C. Campagne, S. Royer, T. Loiseau, C. Volkringer, *Coord. Chem. Rev.* 2022, 467, 214598.

[27] L. Valenzano, B. Civalleri, S. Chavan, S. Bordiga, M. H. Nilsen, S. Jakobsen, K. P. Lillerud, C. Lamberti, *Chem. Mater.* 2011, 23, 1700-1718.

[28] J. H. Cavka, S. Jakobsen, U. Olsbye, N. Guillou, C. Lamberti, S. Bordiga, K. P. Lillerud, *J. Am. Chem. Soc.* 2008, 130, 13850-13851.

[29] J. Yang, Y. Dai, X. Zhu, Z. Wang, Y. Li, Q. Zhuang, J. Shi, J. Gu, *J. Mater. Chem. A* 2015, 3, 7445-7452.

[30] T. Guan, X. Li, W. Fang, D. Wu, *Appl. Surf. Sci.* 2020, 501, 144074.

[31] N. Graf, E. Yegen, T. Gross, A. Lippitz, W. Weigel, S. Krakert, A. Terfort, W. E. S. Unger, *Surf. Sci.* 2009, 603, 2849-2860.

[32] M. G. Goesten, M. F. De Lange, A. I. Olivos-Suarez, A. V. Bavykina, P. Serra-Crespo, C. Krywka, F. M. Bickelhaupt, F. Kapteijn, J. Gascon, *Nat. Commun.* 2016, 7, 11832.

[33] F. C. N. Firth, M. W. Gaultois, Y. Wu, J. M. Stratford, D. S. Keeble, C. P. Grey, M. J. Cliffe, *J. Am. Chem. Soc.* 2021, 143, 19668-19683.

[34] S. E. Morgan, A. M. O'Connell, A. Jansson, G. W. Peterson, J. J. Mahle, T. B. Eldred, W. Gao, G. N. Parsons, *ACS Appl. Mater. Interfaces* 2021, 13, 31279-31284.

[35] E. Virmani, J. M. Rotter, A. Mahringer, T. Von Zons, A. Godt, T. Bein, S. Wuttke, D. D. Medina, *J. Am. Chem. Soc.* 2018, 140, 4812-4819.

[36] S. Gökpinar, T. Diment, C. Janiak, *Dalt. Trans.* 2017, 46, 9895-9900.

[37] S. Sundarrajan, A. R. Chandrasekaran, S. Ramakrishna, *J. Am. Ceram. Soc.* 2010, 93, 3955-3975.

[38] D. T. Lee, Z. Dai, G. W. Peterson, M. G. Hall, N. L. Pomerantz, N. Hoffman, G. N. Parsons, *Adv. Funct. Mater.* 2022, 32, 2108004-2108016.

[39] G. W. Peterson, A. X. Lu, T. H. Epps, *ACS Appl. Mater. Interfaces* 2017, 9, 32248-32254.

SUPPLEMENTAL REFERENCES

[1] H. Reinsch, S. Waitschat, S. M. Chavan, K. P. Lillerud, N. Stock, *Eur. J. Inorg. Chem.* 2016, 2016, 4490-4498.

[2] Z. Chen, X. Wang, T. Islamoglu, O. K. Farha, *Inorganics* 2019, 7, 2-3.

[3] F. Joly, P. Devaux, T. Loiseau, M. Arab, B. Morel, C. Volkringer, *Microporous Mesoporous Mater.* 2019, 288, 109564-109570.

[4] M. N. Nimbalkar, B. R. Bhat, *Mater. Today Proc.* 2019, 9, 522-527.

[5] C. Avci-camur, J. Perez-Carvajal, I. Imaz, D. Maspoch, *ACS Sustain. Chem. Eng.* 2018, 6, 14554-14560.

[6] C. Avci-camur, J. Troyano, J. Pérez-Carvajal, A. Legrand, D. Farrusseng, I. Imaz, D. Maspoch, *Green Chem.* 2018, 20, 873-878.

[7] Y. Zhang, B. Li, Y. Wei, C. Yan, M. Meng, Y. Yan, *J. Taiwan Inst. Chem. Eng.* 2019, 96, 93-103.

[8] G. Ye, D. Zhang, X. Li, K. Leng, W. Zhang, J. Ma, Y. Sun, W. Xu, S. Ma, *ACS Appl. Mater. Interfaces* 2017, 9, 34937-34943.

[9] Z. Wang, Y. Huang, J. Yang, Y. Li, Q. Zhuang, J. Gu, *Dalt. Trans.* 2017, 46, 7412-7420.

[10] Y. Huang, W. Lo, Y. Kuo, W. Chen, C. Lin, F. Shieh, *ChemComm* 2017, 53, 5818-5821.

[11] H. Reinsch, B. Bueken, F. Vermoortele, I. Stassen, A. Lieb, K. Lillerud, D. De Vos, *Cryst Eng Comm* 2015, 17, 4070-4074.

[12] M. Ermer, J. Mehler, M. Kriesten, Y. S. Avadhut, P. S. Schulz, M. Hartmann, *Dalt. Trans.* 2018, 47, 14426-14430.

[13] Z. Hu, A. Gami, Y. Wang, D. Zhao, *Adv. Sustain. Syst.* 2017, 1, 1700092-1700104.

[14] Z. Hu, I. Castano, S. Wang, Y. Wang, Y. Peng, Y. Qian, C. Chi, X. Wang, D. Zhao, *Cryst. Growth Des.* 2016, 16, 2295-2301.

[15] Z. Hu, Y. Peng, Z. Kang, Y. Qian, D. Zhao, *Inorg. Chem.* 2015, 54, 4862-4868.

[16] F. C. N. Firth, M. J. Cliffe, D. Vulpe, M. Aragones-Anglada, P. Z. Moghadam, D. Fairen-Jimenez, B. Slater, C. P. Grey, *J. Mater. Chem. A* 2019, 7, 7459-7469.

[17] X. Sang, J. Zhang, J. Xiang, J. Cui, L. Zheng, J. Zhang, Z. Wu, Z. Li, G. Mo, Y. Xu, J. Song, C. Liu, X. Tan, T. Luo, B. Zhang, B. Han, *Nat. Commun.* 2017, 8, 175.

[18] Z. Chen, X. Wang, H. Noh, G. Ayoub, G. W. Peterson, C. T. Buru, T. Islamoglu, O. K. Farha, *Cryst Eng Comm* 2019, 21, 2409-2415.

[19] M. Ermer, J. Mehler, B. Rosenberger, M. Fischer, P. S. Schulz, M. Hartmann, *Chemistry Open* 2021, 10, 233-242.

[20] Q. Yang, S. Vaesen, F. Ragon, A. D. Wiersum, D. Wu, A. Lago, T. Devic, C. Martineau, F. Taulelle, P. L. Llewellyn, H. Jobic, C. Zhong, C. Serre, G. De Weireld, G. Maurin, *Angew. Chemie-Int. Ed.* 2013, 52, 10316-10320.

[21] J. M. Yassin, A. M. Taddesse, M. Sánchez-Sánchez, *Catal. Today* 2022, 390-391, 162-175.

[22] B. Karadeniz, A. J. Howarth, T. Stolar, T. Islamoglu, I. Dejanović, M. Tireli, M. C. Wasson, S. Y. Moon, O. K. Farha, T. Friščić, K. Užarević, *ACS Sustain. Chem. Eng.* 2018, 6, 15841-15849.

[23] I. Pakamore, J. Rousseau, C. Rousseau, E. Monflier, P. Á. Szilágyi, *Green Chem.* 2018, 20, 5292-5298.

[24] F. Ragon, B. Campo, Q. Yang, C. Martineau, A. D. Wiersum, A. Lago, V. Guillerm, C. Hemsley, J. F. Eubank, M. Vishnuvarthan, F. Taulelle, P. Horcajada, A. Vimont, P. L. Llewellyn, M. Daturi, S. Devautour-Vinot, G. Maurin, C. Serre, T. Devic, G. Clet, *J. Mater. Chem. A* 2015, 3, 3294-3309.

[25] D. T. Lee, Z. Dai, G. W. Peterson, M. G. Hall, N. L. Pomerantz, N. Hoffman, G. N. Parsons, *Adv. Funct. Mater.* 2022, 32, 2108004-2108016.

[26] S. E. Morgan, A. M. O'Connell, A. Jansson, G. W. Peterson, J. J. Mahle, T. B. Eldred, W. Gao, G. N. Parsons, *ACS Appl. Mater. Interfaces* 2021, 13, 31279-31284.

[27] S. E. Morgan, M. L. Willis, G. W. Peterson, J. J. Mahle, G. N. Parsons, *ACS Sustain. Chem. Eng.* 2022, 10, 2699-2707.

[28] F. Zhao, C. Su, W. Yang, Y. Han, X. Luo, C. Li, W. Tang, T. Yue, Z. Li, *Appl. Surf. Sci.* 2020, 527, 146862-146872.

[29] L. Huelsenbeck, H. Luo, P. Verma, J. Dane, R. Ho, E. Beyer, H. Hall, G. M. Geise, G. Giri, *Cryst. Growth Des.* 2020, 20, 6787-6795.

[30] L. Song, T. Zhao, D. Yang, X. Wang, X. Hao, Y. Liu, S. Zhang, Z.-Z. Yu, *J. Hazard. Mater.* 2020, 393, 122332-122344.

[31] K. Ma, T. Islamoglu, Z. Chen, P. Li, M. C. Wasson, Y. Chen, Y. Wang, G. W. Peterson, J. H. Xin, O. K. Farha, *J. Am. Chem. Soc.* 2019, 141, 15626-15633.

[32] D. K. Yoo, S. H. Jhung, *ACS Appl. Mater. Interfaces* 2019, 11, 47649-47657.

[33] J. Hyunsook, M.-K. Kim, S. Jang, *J. Colloid Interface Sci.* 2020, 563, 363-369.

[34] A. X. Lu, A. M. Ploskonka, T. M. Tovar, G. W. Peterson, J. B. Decoste, *Ind. Eng. Chem. Res.* 2017, 56, 14502-14506.

[35] N. L. Pomerantz, E. E. Anderson, N. P. Dugan, N. F. Hoffman, H. F. Barton, D. T. Lee, C. J. Oldham, G. W. Peterson, G. N. Parsons, *ACS Appl. Mater. Interfaces* 2019, 11, 24683-24690.

[36] D. B. Dwyer, D. T. Lee, S. Boyer, W. E. Bernier, G. N. Parsons, W. E. Jones, *ACS Appl. Mater. Interfaces* 2018, 10, 25794-25803.

[37] M. A. Bunge, A. B. Davis, K. N. West, C. W. West, T. G. Glover, *Ind. Eng. Chem. Res.* 2018, 57, 9151-9161.

[38] M.-K. K. Kim, S. H. Kim, M. Park, S. G. Ryu, H. Jung, *RSC Adv.* 2018, 8, 41633-41638.

[39] N. Couzon, M. Ferreira, S. Duval, A. El-Achari, C. Campagne, T. Loiseau, C. Volkringer, *ACS Appl. Mater. Interfaces* 2022, 14, 21497-21508.

Example 2

Methods 1.a. "Full DMF" fiber@UiO-66-NH$_2$ sorption-vapor and solvothermal UiO-66-NH2 powder synthesis. This process uses the same general procedure and solvent systems as our previous report.[1] In general, 0.32 g (1.37 mmol) ZrCl$_4$ is added to 10 mL DMF and dissolved via sonication. 0.232 g (1.27 mmol) BDC-NH$_2$ is then added along with 665 µL HCl and 13 µL DI H$_2$O followed by stirring 5 minutes. A fabric swatch is then submerged in the mother solution, sonicated 10 minutes, then removed and suspended over 8.4 mL DMF and 1.6 mL HOAc in a media vial. The vial is then heated at 100° C. for 3 hr unless otherwise noted. After cooling fibers are removed, washed in DMF overnight replacing the solvent after 5 minutes, followed by ethanol overnight replacing the solvent after 5 minutes. MOF-fibers are then activated at 75° C. overnight followed by vacuum drying at 85° C. overnight. MOF powders were synthesized by heating the precursor solution at 100° C. for 3 hr. Powders were collected by vacuum filtration and then washed in DMF followed by EtOH, dried at 75° C. and 85° C. under vacuum.

1.b. "Partial DMF" fiber@UiO-66-NH$_2$sorption-vapor and solvothermal UiO-66-NH$_2$ powder synthesis. The same process was followed as described in main text except for replacing the 1/1/1 GVL/H$_2$O/EtOH solution with a 1/1.5/1.5 mixture of DMF/H$_2$O/EtOH. MOF powders were synthesized by adding HOAc (5 mL) to a 10 mL precursor solution followed by heating at 90° C. for 24 hr. Powders were filtered out and washed in EtOH for 24 hr followed by drying at 75° C. 24 hr and 85° C. 24 hr under vacuum.

1.c. "EtOH" fiber@UiO-66-NH$_2$ sorption-vapor synthesis and solvothermal UiO-66-NH$_2$ powder synthesis. A mixture of 5 mL EtOH and 5 mL H$_2$O is heated to 60° C. 0.116 g (0.639 mmol) of crushed BDC-NH$_2$ is then added followed by heating to 70° C. and mixing for 20 minutes. 0.16 g (0.69 mmol) is added and the mixture is stirred at 70° C. for 10 min. A fiber mas is then submerged in the precursor mixture and sonicated for 10 min. The fibers are removed and suspended over a 10 mL mixture of water and acetic acid and heated at 90° C. for 24 hours. After cooling, the fibers are washed in ethanol for 24 hrs replacing the solvent once followed by drying and activating at 85° C. under vacuum for 24 hrs. MOF powders were synthesized by adding HOAc (5 mL) to the precursor solution followed by heating at 90° C. for 24 hr. Powders were filtered out and washed in EtOH for 24 hr followed by drying at 75° C. 24 hr and 85° C. 24 hr under vacuum.

1.d. "GVL" UiO-66-NH$_2$ solvothermal powder synthesis. 0.232 g (1.27 mmol) BDC-NH$_2$ are crushed and added to a 20 mL of equal parts GVL/H$_2$O/EtOH by volume in a scintillation vial. Mixture is sonicated 20 minutes to obtain a clear solution. 0.32 g (1.37 mmol) ZrCl$_4$ are added, and the mixture is sonicated for an additional 10 minutes. 1 mL HOAc was added and well mixed into the solution. The vial was then placed in a preheated oven at 90° C. for 24 hr. Powder was filtered out, washed in EtOH for overnight, dried at 75° C. overnight, and active at 85° C. under vacuum overnight.

1.e. Fiber@HKUST-1 green sorption-vapor synthesis. 0.35 g (1.67 mmol) trimesic acid were dissolved in 20 mL 1/1/1 GVL/H$_2$O/EtOH by sonication for 20 min. 0.725 g copper(II)nitrate trihydrate were followed by 20 min sonication. A fiber mat was then submerged and sonicated 10 min. The mat was then immediately suspended over 60 mL 1/1 H$_2$O/HOAc mixture and heated at 90° C. for 24 hr. Fibers were then washed in EtOH for 24 hr with replacing the solvent once then dried at 75° C. for 24 hr and 85° C. 24 hr under vacuum.

1.f. Fiber@MOF-808 green sorption-vapor synthesis. 0.268 g (1.26 mmol) trimesic acid were dissolved in 20 mL 1/1/1 GVL/H$_2$O/EtOH by sonication for 20 min. 0.32 g (1.37 mmol) zirconium tetrachloride were added followed by sonication for 10 min. A fiber swatch was then submerged in the precursor solution and sonicated for 10 min. The fiber swatch was then removed and immediately suspended over 60 mL 1/1 H$_2$O/HOAc and heated at 90° C. for 24 hr. Fibers were washed in EtOH for 24 hr replacing the solvent once, dried at 75° C. for 24 hr, and then dried at 85° C. under vacuum for 24 hr.

1.g. Example calculation of DMNP TOFt$_{1/2}$:

$$\text{slope} = \frac{dDMNP}{dt} \text{ evaluated at } t_{1/2}$$

$$TOF_{t1/2} = \frac{dDMNP/dt}{[MOF]} = \frac{\text{slope}}{[MOF]}(\text{min}^{-1})$$

We explored UiO-66-NH$_2$ solvothermal powder synthesis in five different GVL/EtOH/H$_2$O/HOAc mixtures listed in Table 2.2. The resulting UiO-66-NH$_2$ powders were characterized using XRD, N$_2$ isotherms, and DMNP hydrolysis with data is shown in FIG. 2.1. Results show that pure GVL (#1) can be used as solvent for UiO-66-NH$_2$ synthesis. The addition of a small amount of HOAc and H$_2$O to pure GVL (#2) slightly improves the BET SA and DMNP kinetics. GVL diluted with EtOH/H$_2$O (#3) resulted in powder with poor crystallinity. The addition of a small amount of HOAc to #3 (#4) allowed for crystalline powder to be formed with similar BET SA and DMNP kinetics to undiluted GVL (#1 and #2). Using a higher concentration of HOAc (#5) reversed this effect and decreased crystallinity, BET SA, and DMNP kinetics. To explore the change between #4 and #5, we measured the pH of equal volume mixtures of GVL, GVL/EtOH/H$_2$O, and GVL/ETOH/H$_2$O/HOAc which were 6.3, 5.1, and 2.1, respectively. Even at only 25% v/v HOAc, the pH is below the linker $pK_a$ hindering deprotonation and MOF formation.[2]

GVL sorption-vapor methods were considered for MOF-808 and HKUST$^{-1}$ spandex composite synthesis. MOF-spandex composites were analyzed with SEM, XRD, and BET with results shown in FIG. 2.8A-2.8F. Spandex@MOF-808 was also tested for DMNP hydrolysis. Dissolution of MOF precursors, corresponding metal salts and linkers, in GVL at room temperature are shown in FIG. 2.8A. MOF-808 precursors dissolved into a clear solution. HKUST$^{-1}$ precursor solution was opaque. Spandex@HKUT$^{-1}$ had visible MOF agglomerates on the surfaces (FIG. 2.8B). SEM images, FIGS. 2.8C and 2.8D, reveal modular, round MOF-808 growth. HKUST$^{-1}$ crystals are nano-scale octahedral shaped. XRD, FIG. 2.8E, of spandex@MOF-808 did not indicate any crystallinity of the MOF. Spandex@HKUST$^{-1}$ XRD included peaks associated with HKUST$^{-1}$. BET SA of spandex@MOF-808 and spandex@HUST$^{-1}$ were 13 and 19 $m^2/g_{comp}$, respectively. DMNP hydrolysis conversion plot for spandex@MOF-808 is shown in FIG. 2.8F with a DMNPt$_{1/2.14,4}$ of 22 min.

TABLE 2.1

Composition of solvent sytems used for MOF powder and MOF-fabric synthesis

| Solvent designation | Volume fraction solvent (%) | | | | Volume fraction modulator (%)* | |
|---|---|---|---|---|---|---|
| | DMF | H$_2$O | EtOH | GVL | HOAc | HCl |
| "Full DMF" | 99.9 | 0.1 | 0.0 | 0.0 | 0.0 | 6.6 |
| "Partial DMF" | 25.0 | 37.5 | 37.5 | 0.0 | 50.0 | 0.0 |
| "EtOH" | 0.0 | 50.0 | 50.0 | 0.0 | 50.0 | 0.0 |
| "GVL" | 0.0 | 33.3 | 33.3 | 33.3 | 5.0 | 0.0 |

*Modulator volume fraction is the volume of modulator divided by the total volume of solvent.

TABLE 2.2

GVL solvent mixtures studied and the resulting UiO-66-NH$_2$ powder properties.

| Solvent # | Volume fraction solvent (%) | | | Volume fraction modulator (%)* | BET SA | DMNP t$_{1/2,2,5,4}$ | TOP t$_{1/2}$ |
|---|---|---|---|---|---|---|---|
| | GLV | EtOH | H$_2$O | HOAc | m$^2$/g | min | min$^{-1}$ |
| 1 | 100.0 | 0.0 | 0.0 | 0.0 | 755 | 4.5 | 0.87 |
| 2 | 99.8 | 0.0 | 0.2 | 10.0 | 857 | 4.1 | 0.91 |
| 3 | 50.0 | 25.0 | 25.0 | 0.0 | n/a | n/a | n/a |
| 4 "GVL" | 33.3 | 33.3 | 33.3 | 5.0 | 811 | 5.8 | 0.76 |
| 5 | 33.3 | 33.3 | 33.3 | 33.3 | 782 | 15 | 0.29 |

*Modulator volume fraction is the volume of modulator divided by the total volume of solvent.

Less faceted (i.e. round) crystal shapes rather than the typical octahedral shape for MOF-808 have previously been reported when water and acetic acid were used as solvents.[3] It is possible that altering the modulator used a crystalline MOF-808 could be formed.

PET@UiO-66-NH$_2$ synthesized with ETOH and UiO-66-NH$_2$ powder were tested for adsorption of acid-orange 7 (AO-7). 0.14 mM AO-7 were dissolved in DI H$_2$O. Fabric, MOF-fabric, or MOF powder was then submerged in the solution and stirred. 500 µL aliquots were taken and diluted in 2.5 mL H$_2$O at various time points. The concentration of AO-7 in solution was determined by measuring the UV absorbance at 482 nm. Images of the UiO-66-NH$_2$ powder and AO-7 solution before and after adsorption are shown in FIG. 2.9A. UiO-66-NH$_2$ powder adsorbed 88 mg$_{AO-7}$/g$_{MOF}$. AO-7 adsorbed per time for PET and PET@UiO-66-NH$_2$ is plotted in FIG. 2.9B. Uncoated PET became pale yellow and only adsorbed 0.6 mg$_A$O-7/9$_{fabric}$. PET@UiO-66-NH$_2$ became bright orange and adsorbed 12 mg$_{AO-7}$/g$_{MOF-fabric}$ or

TABLE 2.3

Summary of fiber @ UiO-66-NH$_2$ composites reported.

| Solvents | Fiber | BET SA (m$^2$/g$_{comp}$) | Adhesion | DMNPt$_{1/2}$ (min) |
|---|---|---|---|---|
| full DMF | Spandex | 48 ± 5 | ✓ | 58 |
| | Cotton | 8 | ✓ | 170 |
| partial DMF | Spandex | 30 ± 5 | ✓ | 44 ± 16 |
| | Cotton | 33 | ✓ | N/A |
| | PET | 82 | ✓ | N/A |
| EtOH | Spandex | 68 ± 19 | ✓ | 20 ± 1 |
| | Cotton | 44 | X | N/A |
| | PET | 154 ± 15 | X | 2.5 |
| GVL | Spandex | 31 ± 12 | ✓ | 29 ± 8 |
| | Cotton | 24 ± 4 | ✓ | 96 |
| | PET | 64 | ✓ | 60 |
| | PP | 44 | ✓ | 18 |
| | Nyco | 21 | ✓ | N/A |

TABLE 2.4

Cottton@UiO-66-NH$_2$ measured properties.

| Solvent designation | Adhesion | Relative crystal size | BET SA (m$^2$/g$_{comp}$) | MOF mass loading | | DMNP $_{t1/2,14,4}$ (min) |
|---|---|---|---|---|---|---|
| | | | | From mass (wt %) | From BET (wt %) | |
| "Full DMF" | N/A | N/A | 5 | N/A | <1 | 200 |
| "Partial DMF" | ✓ | small | 33 | N/A | 3.3 | N/A |
| "EtOH" | X | small | 44 | N/A | 4.4 | N/A |
| "GVL" | ✓ | medium | 24 ± 4 | N/A | 3.0 ± 0.5 | 96 |

170 mg$_{AO-7}$/g$_{MOF}$ approximately doubling the performance of freestanding powder. PET@UiO-66-NH$_2$ was then exposed to fresh water, and after 9 days the MOF-fabric still maintained over 120 mg$_{AO-7}$/g$_{MOF\text{-}fabric}$ indication strong interactions between the dye and MOF. After AO-7 adsorption experiments, the PET@UiO-66-NH$_2$ also maintained approximately 75% efficiency for DMNP hydrolysis.

EXAMPLE 2 REFERENCES (1) Morgan, S. E.; Connell, A. M. O.; Jansson, A.; Peterson, G. W.; Mahle, J. J.; Eldred, T. B.; Gao, W.; Parsons, G. N. Stretchable and Multi-Metal—Organic Framework Fabrics Via High-Yield Rapid Sorption-Vapor Synthesis and Their Application in Chemical Warfare Agent Hydrolysis. *ACS Appl. Mater. Interfaces* 2021, 13, 31279-31284.

(2) Huelsenbeck, L.; Luo, H.; Verma, P.; Dane, J.; Ho, R.; Beyer, E.; Hall, H.; Geise, G. M.; Giri, G. Generalized Approach for Rapid Aqueous MOF Synthesis by Controlling Solution PH. *Cryst. Growth Des.* 2020, 20, 6787-6795.

(3) Thur, R.; Velthoven, N. Van; Lemmens, V.; Bastin, M.; Smolders, S.; Vos, D. De; Vankelecom, I. F. J. Modulator-Mediated Functionalization of MOF-808 as a Platform Tool to Create High-Performance Mixed-Matrix Membranes. *Appl. Mater. Interfaces* 2019, 11, 44792-44801.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

What is claimed is:

1. A method of making a metal organic framework (MOF)-fabric composite comprising:
    introducing a solution to a fabric, wherein the solution comprises a metal salt, a linker, and a solvent;
    absorbing the solution onto the fabric, wherein the fabric is on a first roller and wherein the solution is adsorbed onto the fabric as the fabric passes from the first roller to a second roller;
    suspending the fabric over a heated vapor for about 10 minutes to 24 hours such that the vapor releases vapor onto the fabric, wherein the metal salt, the linker, and the solvent diffuse out of a plurality of polymer fibers, wherein the linker links metal in the metal salts to form crystals attached to the fabric, and wherein the vapor aids in crystallization.

2. The method of claim 1, wherein the metal salt is ZrCl$_4$.

3. The method of claim 1, wherein the linker is 2-aminoterephthalic acid (BDC-NH$_2$).

4. The method of claim 1, wherein the solvent is selected from water, ethanol, acetic acid, γ-valerolactone (GVL), and combinations thereof.

5. The method of claim 1, wherein the fabric comprises polymer fibers.

6. The method of claim 1, wherein the fabric is selected from spandex, polyethylene terephthalate, cotton, nyco, and polypropylene.

7. The method of claim 1, wherein the solution comprises a first solution and a second solution, wherein:
    the first solution comprises the linker in a first solvent mixture and wherein the second solution comprises the metal salt in a second solvent mixture; and
    wherein the introducing comprises introducing the first solution and the second solution separately to the fabric.

8. The method of claim 1, wherein the crystals are UiO-66-NH$_2$ crystals.

9. The method of claim 1, wherein the vapor comprises H$_2$O, acetic acid, and a combination thereof.

10. The method of claim 1, further comprising repeating the method to add additional crystals onto the fabric.

11. The method of claim 1, further comprising:
    suspending the fabric over a vapor for about 10 minutes to 24 hours such that vapor is released onto the fabric, wherein the vapor is contained in an insulated heating box through which the fabric passes during the continuous processing.

* * * * *